United States Patent
Devassy et al.

(10) Patent No.: US 12,067,869 B2
(45) Date of Patent: Aug. 20, 2024

(54) SYSTEMS AND METHODS FOR GENERATING SOURCE-AGNOSTIC TRAJECTORIES

(71) Applicant: Lyft, Inc., San Francisco, CA (US)

(72) Inventors: Joan Devassy, San Mateo, CA (US); Mousom Dhar Gupta, London (GB); Hugo Oscar Bonay Grimmett, Berlin (DE); Swarn Avinash Kumar, Mountain View, CA (US); Michal Witkowski, London (GB)

(73) Assignee: Lyft, Inc., San Francisco, CA (US)

( * ) Notice: Subject to any disclaimer, the term of this patent is extended or adjusted under 35 U.S.C. 154(b) by 724 days.

(21) Appl. No.: 16/938,530

(22) Filed: Jul. 24, 2020

(65) Prior Publication Data

US 2022/0028262 A1  Jan. 27, 2022

(51) Int. Cl.

| | |
|---|---|
| *G01C 21/32* | (2006.01) |
| *G01C 21/00* | (2006.01) |
| *G01V 7/16* | (2006.01) |
| *G05D 1/02* | (2020.01) |
| *G06F 16/22* | (2019.01) |
| *G06F 16/23* | (2019.01) |
| *G06F 16/29* | (2019.01) |
| *G06T 7/73* | (2017.01) |
| *G06T 17/05* | (2011.01) |
| *G08G 1/056* | (2006.01) |

(52) U.S. Cl.
CPC ............. *G08G 1/056* (2013.01); *G01V 7/16* (2013.01); *G06F 16/22* (2019.01); *G06F 16/2365* (2019.01); *G06F 16/29* (2019.01)

(58) Field of Classification Search
None
See application file for complete search history.

(56) References Cited

U.S. PATENT DOCUMENTS

| | | | |
|---|---|---|---|
| 2011/0125404 A1* | 5/2011 | Czompo ................. G01S 19/49 701/472 |
| 2019/0301873 A1* | 10/2019 | Prasser .............. G01C 21/3848 |
| 2020/0159247 A1* | 5/2020 | Cohen ..................... G06V 20/41 |
| 2021/0003415 A1* | 1/2021 | Milstein ............. G01C 21/3815 |
| 2021/0150280 A1* | 5/2021 | White ................ G01C 21/3605 |
| 2021/0404814 A1* | 12/2021 | Hess ....................... G01C 21/32 |
| 2021/0407114 A1* | 12/2021 | Das ........................... G06T 3/20 |

\* cited by examiner

*Primary Examiner* — Adam D Tissot
*Assistant Examiner* — Michael T Silva
(74) *Attorney, Agent, or Firm* — Lee Sullivan Shea & Smith LLP

(57) ABSTRACT

Examples disclosed herein involve a computing system configured to (i) obtain (a) a first set of sensor data captured by a first sensor system of a first vehicle that indicates the first vehicle's movement and location with a first degree of accuracy and (b) a second set of sensor data captured by a second sensor system of a second vehicle that indicates the second vehicle's movement and location with a second degree of accuracy that differs from the first degree of accuracy, (ii) based on the first set of sensor data, derive a first trajectory for the first vehicle that is defined in terms of a source-agnostic coordinate frame, (iii) based on the second set of sensor data, derive a second trajectory for the second vehicle that is defined in terms of the source-agnostic coordinate frame, and (iv) store the first and second trajectories in a database of source-agnostic trajectories.

20 Claims, 13 Drawing Sheets

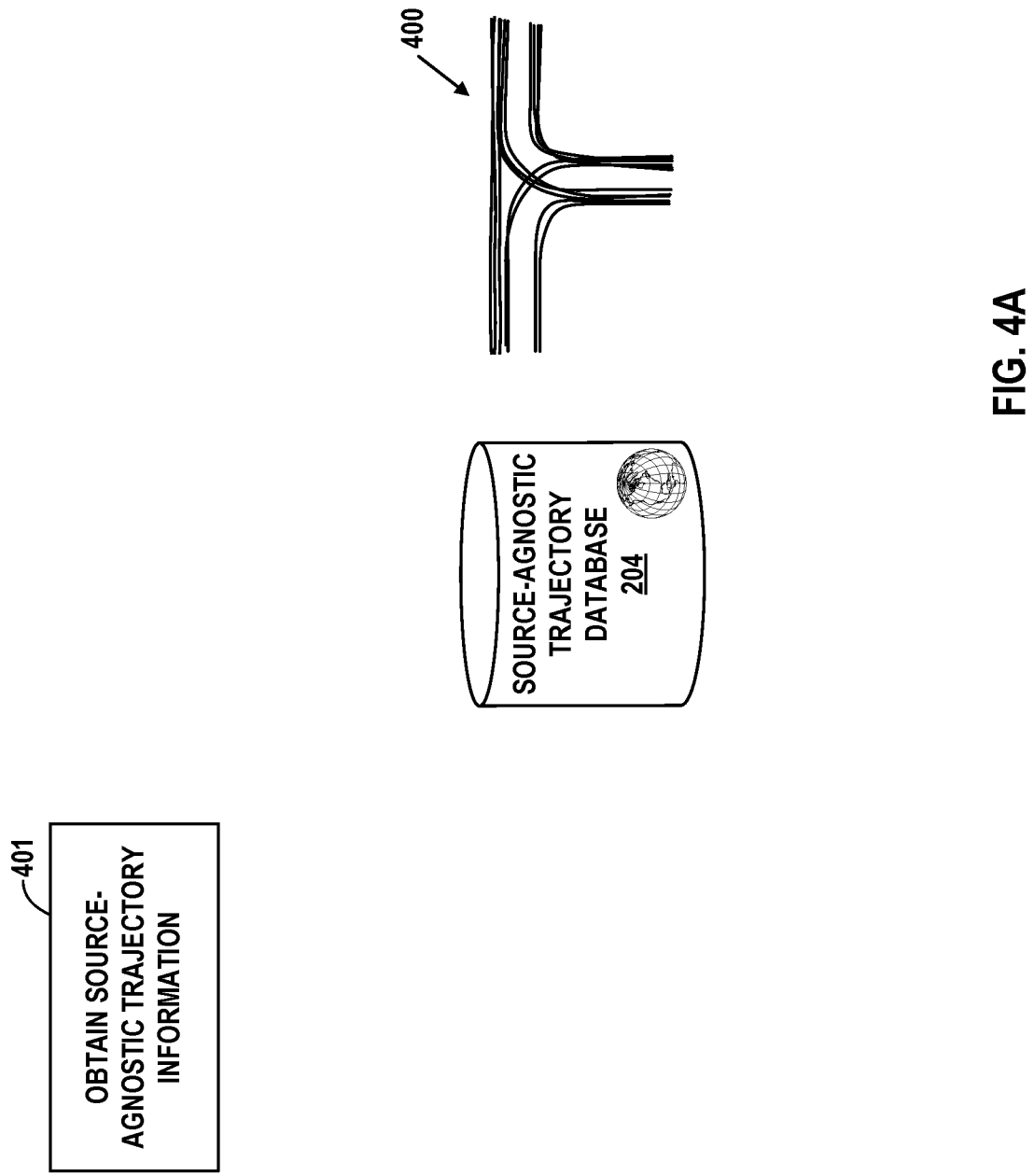

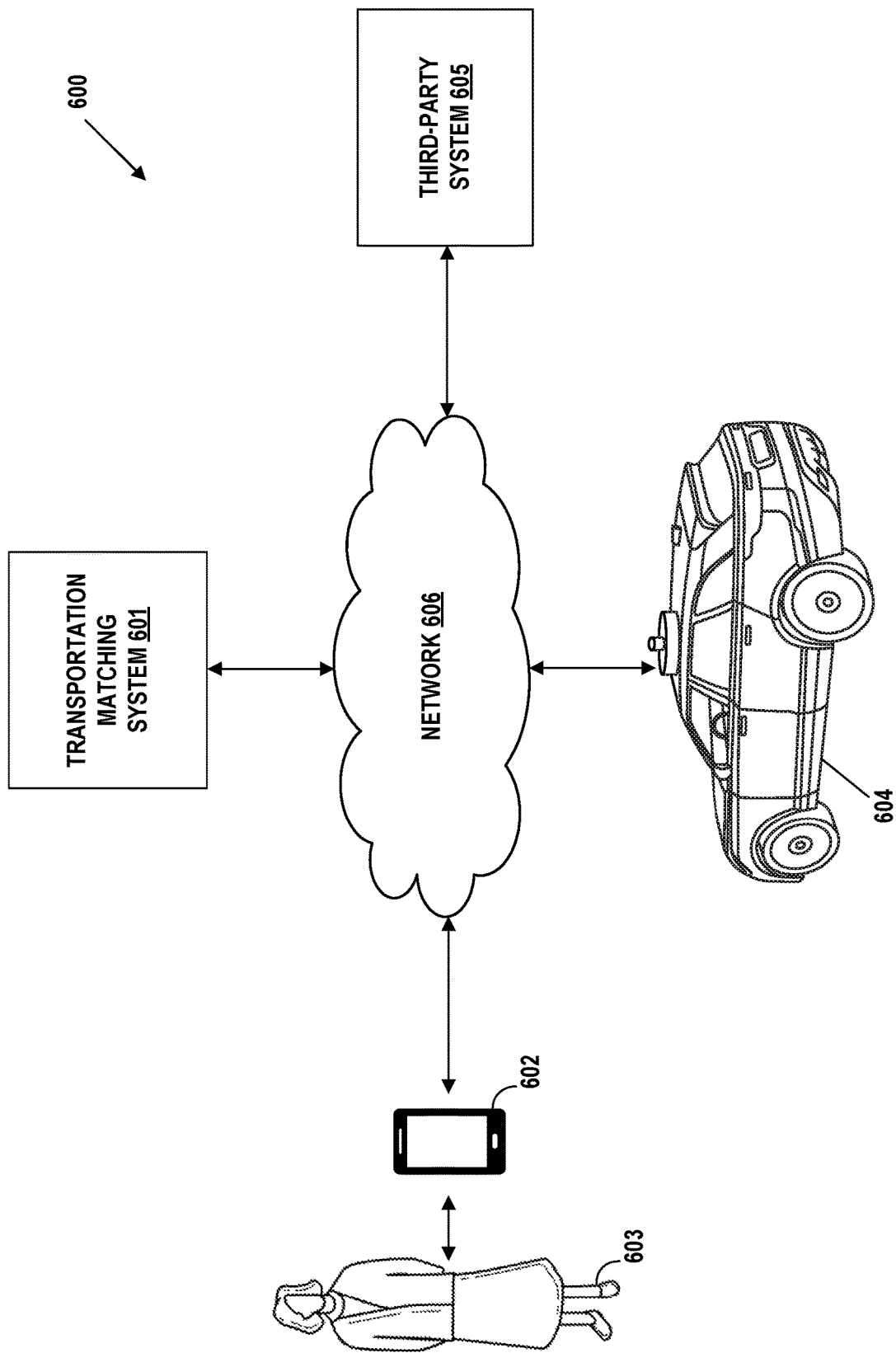

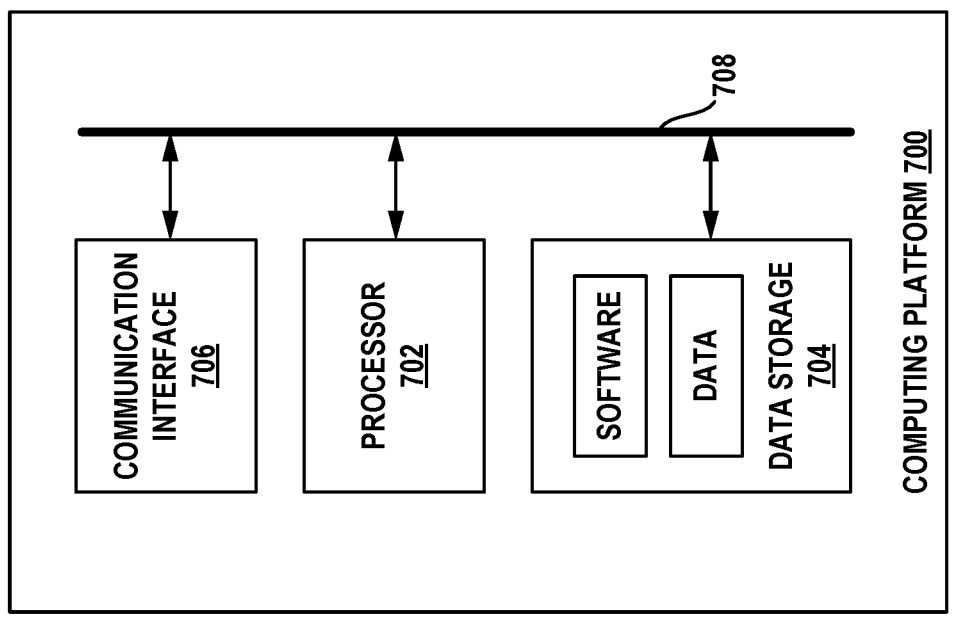

SYSTEMS AND METHODS FOR GENERATING SOURCE-AGNOSTIC TRAJECTORIES

BACKGROUND

In various areas of technology, pre-processed information about the world (which may sometimes be referred to as a map or map data) may be utilized to perform various operations. As one example of such a technology area, on-board computing systems of vehicles (e.g., autonomy systems and/or advanced driver assistance systems) may use pre-processed information about the world when performing operations for vehicles such as localization, perception, prediction, and/or planning, among other possibilities. As another example of such a technology area, transportation-matching platforms may use pre-processed information about the world to perform operations such as matching individuals with available vehicles, generating routes for vehicles to follow when picking up and/or transporting individuals, providing estimates of pickup and drop-off times, choosing locations for performing pickups and/or drop-offs, and/or pre-positioning vehicles within the given area in anticipation of responding to transportation requests, among other possibilities. It should be understood that pre-processed information about the world (or perhaps other geographically-associated information) may be used in various other areas of technology as well. As such, there is a need for techniques that are capable of generating accurate, up-to-date information about the world that can be used for these applications.

SUMMARY

In one aspect, the disclosed technology may take the form of a method that involves (i) obtaining (a) a first set of sensor data captured by a first sensor system of a first vehicle, where the first set of sensor data indicates the first vehicle's movement and location with a first degree of accuracy and (b) a second set of sensor data captured by a second sensor system of a second vehicle, where the second set of sensor data indicates the second vehicle's movement and location with a second degree of accuracy that differs from the first degree of accuracy, (ii) based on the first set of sensor data captured by the first sensor system, deriving a first trajectory for the first vehicle that is defined in terms of a source-agnostic coordinate frame rather than a source-specific coordinate frame associated with the first sensor system, (iii) based on the second set of sensor data captured by the second sensor system, deriving a second trajectory for the second vehicle that is defined in terms of the source-agnostic coordinate frame rather than a source-specific coordinate frame associated with the second sensor system, and (iv) storing the first trajectory for the first vehicle and the second trajectory for the second vehicle in a database of source-agnostic trajectories.

In some example embodiments, the first trajectory for the first vehicle may represent the first vehicle's movement and location with the first degree of accuracy, and the second trajectory for the second vehicle may represent the second vehicle's movement and location with the second degree of accuracy.

Further, in example embodiments, the method may involve determining the first degree of accuracy based on a type of the first sensor system, where the first trajectory for the first vehicle is stored in the database along with an indication of the determined first degree of accuracy, and determining the second degree of accuracy based on a type of the second sensor system, where the second trajectory for the second vehicle is stored in the database along with an indication of the determined second degree of accuracy.

Further yet, in example embodiments, the method may involve (i) obtaining, from the database, the first trajectory for the first vehicle and the second trajectory for the second vehicle, (ii) translating each of the first trajectory for the first vehicle and the second trajectory for the second vehicle from the source-agnostic coordinate frame to a local coordinate frame associated with a map of a geographic area, and either (iii) encoding the translated first trajectory for the first vehicle and the translated second trajectory for the second vehicle into the map as path priors, or (iv) based on the translated first trajectory for the first vehicle and the translated second trajectory for the second vehicle, generating lane information for a roadway junction that is represented within the map.

Still further, in some example embodiments, the first and second sensor systems may include different types of sensor systems.

Still further, in some example embodiments, deriving the first trajectory for the first vehicle that is defined in terms of the source-agnostic coordinate frame may involve (i) based on the first set of sensor data, generating (a) location data for the first vehicle that is defined in terms of the source-agnostic coordinate frame and (b) motion data for the first vehicle that is defined in terms of the source-agnostic coordinate frame, and (ii) using the generated location data and the generated motion data for the first vehicle to derive the first trajectory for the first vehicle that is defined in terms of the source-agnostic coordinate frame. Similarly, deriving the second trajectory for the second vehicle that is defined in terms of the source-agnostic coordinate frame may involve (i) based on the second set of sensor data, generating (a) location data for the second vehicle that is defined in terms of the source-agnostic coordinate frame and (b) motion data for the second vehicle that is defined in terms of the source-agnostic coordinate frame, and (ii) using the generated location data and the generated motion data for the second vehicle to derive the second trajectory for the second vehicle that is defined in terms of the source-agnostic coordinate frame.

In this regard, generating the location data for each of the first and second vehicles may involve, for each respective vehicle (i) generating location data that is represented according to a local coordinate frame associated with the respective sensor system of the respective vehicle by applying localization to at least a subset of the respective set of sensor data captured by the respective sensor system of the respective vehicle, and (ii) translating the generated location data from the local coordinate frame to the source-agnostic coordinate frame.

Still further, in some example embodiments, generating the motion data for each of the first and second vehicles may involve, for each respective vehicle, processing at least a subset of the respective set of sensor data captured by the respective sensor system of the respective vehicle in order to separate the motion of the respective vehicle during a given period of operation from Earth's rotational motion during the given period of operation.

Still further, in some example embodiments, processing at least a subset of the respective set of sensor data captured by the respective sensor system of the respective vehicle in order to separate the motion of the respective vehicle from Earth's rotational motion may involve, for a plurality of respective times during the given period of operation, (i)

determining the Earth's directional gravity vector at a respective time, (ii) determining an orientation of the respective sensor system of the respective vehicle in relation to the Earth's directional gravity vector and the Earth's magnetic field at the respective time, (iii) based on the Earth's directional gravity vector and the determined orientation of the respective sensor system of the respective vehicle, incrementally updating an acceleration measurement captured by the respective sensor system of the respective vehicle at the respective time by removing an effect of the Earth's directional gravity on the acceleration measurement, and (iv) based on the updated acceleration measurement, determining an acceleration and orientation of the respective sensor system of the respective vehicle at the respective time that is independent of the Earth's directional gravity vector.

In another aspect, the disclosed technology may take the form of a computing system comprising at least one processor, a non-transitory computer-readable medium, and program instructions stored on the non-transitory computer-readable medium that are executable by the at least one processor such that the computing system is configured to carry out the functions of the aforementioned method.

In yet another aspect, the disclosed technology may take the form of a non-transitory computer-readable medium comprising program instructions stored thereon that are executable to cause a computing system to carry out the functions of the aforementioned method.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

BRIEF DESCRIPTION OF THE DRAWINGS

FIG. 4A is a diagram that illustrates one example of accessing source-agnostic trajectories stored in a source-agnostic trajectory database.

FIG. 6 is a simplified block diagram that illustrates one example of a transportation-matching platform.

FIG. 7 is a simplified block diagram that illustrates some structural components that may be included in an example computing platform.

DETAILED DESCRIPTION

Figure 1A:
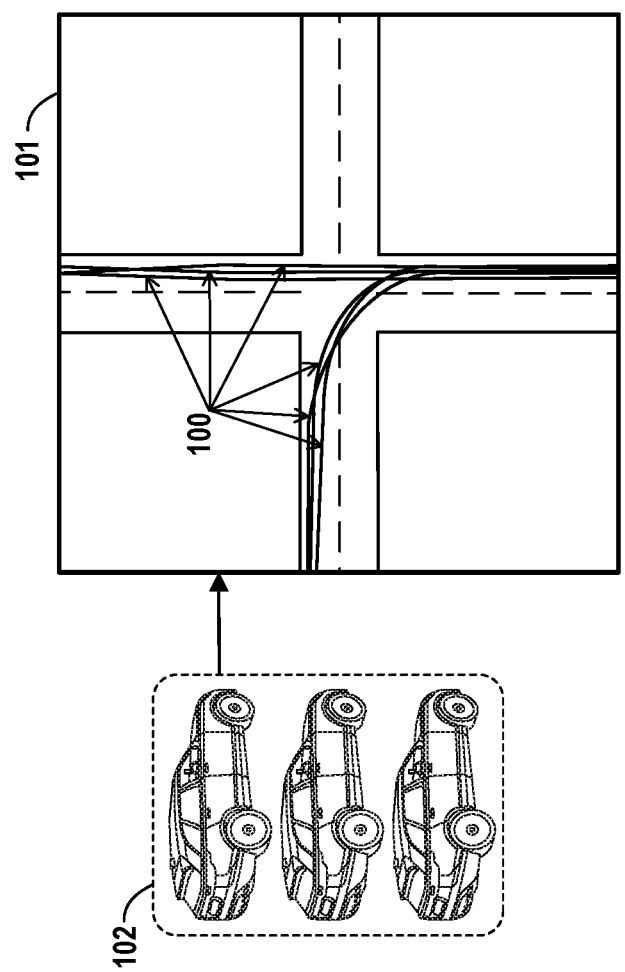
FIG. 1A is a diagram that illustrates an example showing a set of vehicle trajectories represented in a local coordinate frame that are derived from sensor data captures by a fleet of collection vehicles.

Information regarding the prior behavior of vehicles or other types of agents within the real world can be used to help facilitate and improve various aspects of technology, in various ways. One specific example of this information is prior trajectories for vehicles and/or other types of agents in the real world. As used herein, a "trajectory" for an agent generally refers to a representation of the agent's motion and location within the real world over the course of some period of time, which may take the form of a time-sequence of position and orientation (or "pose") values for the agent, among other possibilities.

For instance, as one possibility, prior agent trajectories can be encoded as pre-processed information about the world (e.g., encoded as map data) that can be used by an on-board computing system of a vehicle (e.g., a vehicle equipped with autonomy systems and/or advanced driver assistance systems) during perception, prediction and planning operations. As another possibility, map data relating to prior agent trajectories can be used by a transportation-matching platform that is configured to match individuals interested in obtaining transportation (i.e., "transportation requestors") with vehicles capable of providing such transportation. Such information may improve the transportation-matching platform's ability to perform various operations—including but not limited to matching requestors with available vehicles within the area, generating the most optimal routes for vehicles to follow when picking up and/or transporting requestors within the area, determining pickup and drop-off locations, providing accurate estimates of pickup and drop-off times within the area, and/or effectively pre-positioning vehicles within the area in anticipation of responding to transportation-matching requests. These potential uses for prior agent trajectories, and others, will be discussed in further detail below.

However, it will be appreciated that an extensive and diverse set of prior agent trajectories will generally need to be collected before the improvements noted above can be achieved at scale. For example, if the goal is to encode map data with prior agent trajectories in order to help vehicles' on-board computing systems and/or transportation-matching platforms perform certain operations in a more accurate way, then before this goal can be achieved at scale, prior agent trajectories will need to be collected for an expansive array of different geographic areas. As another example, if the goal is to use prior agent trajectories to create machine learning models utilized by on-board computing systems to carry out operations such as perception, prediction, and/or planning, then before this goal can be achieved at scale, prior agent trajectories will need to be collected for a wide range of different circumstances that could potentially be faced by a vehicle. Unfortunately, it is difficult or impossible to meet these needs using existing approaches for collecting prior agent trajectories.

Indeed, one existing approach for collecting prior agent trajectories makes use of vehicles that are equipped with the types of expensive, LiDAR-based sensor systems typically found on autonomous or semi-autonomous vehicles (AVs), which typically comprises a LiDAR unit combined with a camera array and telematics sensors. As each of these vehicles is being driven within a given area of the real world (typically by humans, but perhaps also with some level of autonomous operation), the vehicle's LiDAR-based sensor system captures high-fidelity sensor data that is indicative of the movement and location of the vehicle (as well as other agents surrounding the vehicle) within the given area, and processing may then be applied to this high-fidelity sensor data in order to derive trajectories for the vehicle (and perhaps also the other surrounding agents). Beneficially, the trajectories that are collected in this manner typically have a very high degree of accuracy, on the order of centimeter-level precision. However, the total number of these types of vehicles that currently exist in the world is relatively small, both because equipping vehicles with a LiDAR-based sensor system is expensive and currently provides limited practical value outside of high-fidelity data collection and autonomous driving, and also because these types of vehicles are typically only found in a limited subset of geographic areas (e.g., cities where autonomous technology is being tested). As such, prior agent trajectories cannot be collected on a large enough scale using these types of vehicles alone.

Because of this, efforts are being made to develop approaches for collecting prior agent trajectories without the use of such vehicles. For instance, efforts are currently being made to develop approaches that enable prior agent trajectories to be collected using vehicles equipped with sensors that are less expensive and/or more widely available than the types of expensive LiDAR-based sensor system typically found on AVs, examples of which may include camera-based sensor systems (which may comprise a monocular and/or stereo camera combined with telematics sensors) and/or telematics-only sensor systems. As above, these new approaches for collecting trajectories using vehicles equipped with these other types of sensor systems generally involve deploying such sensor-equipped vehicles to capture sensor data that is indicative of the movement and location of the vehicles (and perhaps other agents surrounding the vehicles) in the real world and then applying processing to this captured sensor data in order to derive trajectories for the vehicles (and perhaps also the other surrounding agents). Beneficially, these new approaches will allow prior agent trajectories to be collected on a much larger scale than an approach that relies only on vehicles equipped with expensive, LiDAR-based sensor systems. Moreover, while prior agent trajectories collected using these other types of sensor systems are likely to have a lower degree of accuracy (e.g., on the order of meter-level precision) as those collected using LiDAR-based sensor systems given the differences in sensor fidelity, it may still be possible to use such prior agent trajectories to help achieve the improvements noted above—particularly if these other types of sensor systems enable a large enough volume of prior agent trajectories to be collected.

However, collecting prior agent trajectories using vehicles equipped with various different types of sensor systems, having different degrees of accuracy, may present additional challenges that need to be addressed before the prior agent trajectories can be used for the purposes noted above. One such challenge relates to the fact that agent trajectories derived using existing approaches are typically represented according to a "source-specific" coordinate frame that is tied to the particular type of sensor system used to collect the agent trajectories. For instance, agent trajectories collected using a LiDAR-based sensor system are typically represented according to a map coordinate frame that is defined by a LiDAR-based map of the geographic area where the agent trajectories were collected (i.e., a map that was previously created based on sensor data captured by LiDAR-based sensor systems). Alternatively, agent trajectories collected using a camera-based sensor system are typically represented according to a different map coordinate frame that is defined by a camera-based map of the geographic area where the agent trajectories were collected (i.e., a map that was previously created based on sensor data captured by camera-based sensor systems). Alternatively yet, agent trajectories collected using a telematics-only sensor system are typically represented according to a still different map coordinate frame that is defined by a road-network map for the geographic area where the agent trajectories were collected.

Because agent trajectories derived using existing approaches are likely to be represented according to source-specific coordinate frames that are tied to the particular types of sensor systems that capture the source data for such agent trajectories, this means that at least some of the agent trajectories will likely need to be translated into a different coordinate frame before they can be used for the purposes noted above. For instance, in line with the discussion above, it may be desirable to encode agent trajectories collected within a geographic area using telematics-only and/or camera-based sensor systems into a LiDAR-based map of the geographic area that is created for use by vehicles' on-board computing systems to help improve operations such as perception, prediction, and/or planning within the geographic area. However, under existing approaches, the agent trajectories collected using the telematics-only and/or camera-based sensor systems are likely to be represented according to source-specific coordinate frames that differ from the LiDAR-based map's coordinate frame, which means that these agent trajectories would need to be translated from their source-specific coordinate frame to the LiDAR-based map's coordinate frame. In practice, such a translation would typically need to be carried out using a two-step process that involves (i) translating each of a plurality of location points along an agent trajectory from the agent trajectory's source-specific coordinate frame (e.g., a map coordinate frame defined by a road-network map or a camera-based map) to a global coordinate frame, such as an Earth-centered Earth-fixed (ECEF) coordinate frame or a World Geodetic System (WGS) coordinate frame (e.g., WGS 84), and then (ii) translating each of the location points from that global coordinate frame to the LiDAR-based map's coordinate frame.

Unfortunately, this approach of deriving agent trajectories with different degrees of accuracy that are represented according to source-specific coordinate frames, and then using the two-step process described above to translate such agent trajectories from their source-specific coordinate frames to a destination coordinate frame on an as-needed basis, has several drawbacks.

First, as described above, the process of translating an agent trajectory from its source-specific coordinate frame to a different destination coordinate frame may involve two separate translation steps—a first translation from the source-specific coordinate frame to a global coordinate frame such as ECEF and then a second translation from the global coordinate frame to the destination coordinate frame—and these two translation steps may introduce two separate translation errors into the agent trajectory that may collectively degrade the integrity of the agent trajectory. For example, although agent trajectories captured by different types of sensor systems may have different degrees of accuracy depending on the type of sensor system used to capture them, the degree of accuracy is generally bounded by a distribution of measurement error that is generally known within the source-specific coordinate frame in which the sensor data was captured. This, in turn, may provide some degree of certainty regarding the agent trajectories within the source-specific coordinate frame. However, when an agent trajectory is translated to another coordinate frame according to existing approaches, this information regarding the known distribution of measurement error for the agent trajectory is generally lost, thereby removing some certainty in the accuracy of the agent trajectory and resulting in a first translation error. Translating the agent trajectory to yet another coordinate frame may serve to compound this uncertainty as well as introduce an additional component of error. Indeed, in practice, the two translation errors that are introduced into an agent trajectory during the two-step translation process described above may have the potential to distort each location point along the agent trajectory by up to 1-3 meters, which is problematic—particularly when attempting to encode agent trajectories into a high-resolution map.

Second, every time there is a desire to use prior agent trajectories for one of the purposes described above, an initial evaluation may need to be performed in order to determine which source-specific coordinate frame is used to represent each prior agent trajectory and what specific processing steps will need to be performed (if any) in order to translate each prior agent trajectory from its source-specific coordinate frame to the destination coordinate frame, which may introduce inefficiencies that increase the time and cost required to leverage such agent trajectories for the purposes described above.

Third, it is possible that a source-specific coordinate frame could change over time, and these changes could have the potential to invalidate agent trajectories being represented according to that source-specific coordinate frame. For instance, as noted above, agent trajectories collected within a geographic area using a LiDAR-based sensor system are typically represented according to a map coordinate frame defined by a LiDAR-based map of the geographic area that was previously created based on sensor data captured by LiDAR-based sensor systems. However, it is possible that the LiDAR-based map of the geographic area could subsequently undergo changes that impact the LiDAR-based map's coordinate frame (e.g., based on updated sensor data), which may in turn invalidate the agent trajectories that are being represented according to the LiDAR-based map's original coordinate frame.

The existing approach of deriving agent trajectories that are represented according to source-specific coordinate frames that are tied to the particular types of sensor systems used to collect the agent trajectories, and then using the two-step process described above to translate such agent trajectories from their source-specific coordinate frames to a destination coordinate frame on an as-needed basis, may have other drawbacks as well.

Figure 1B:
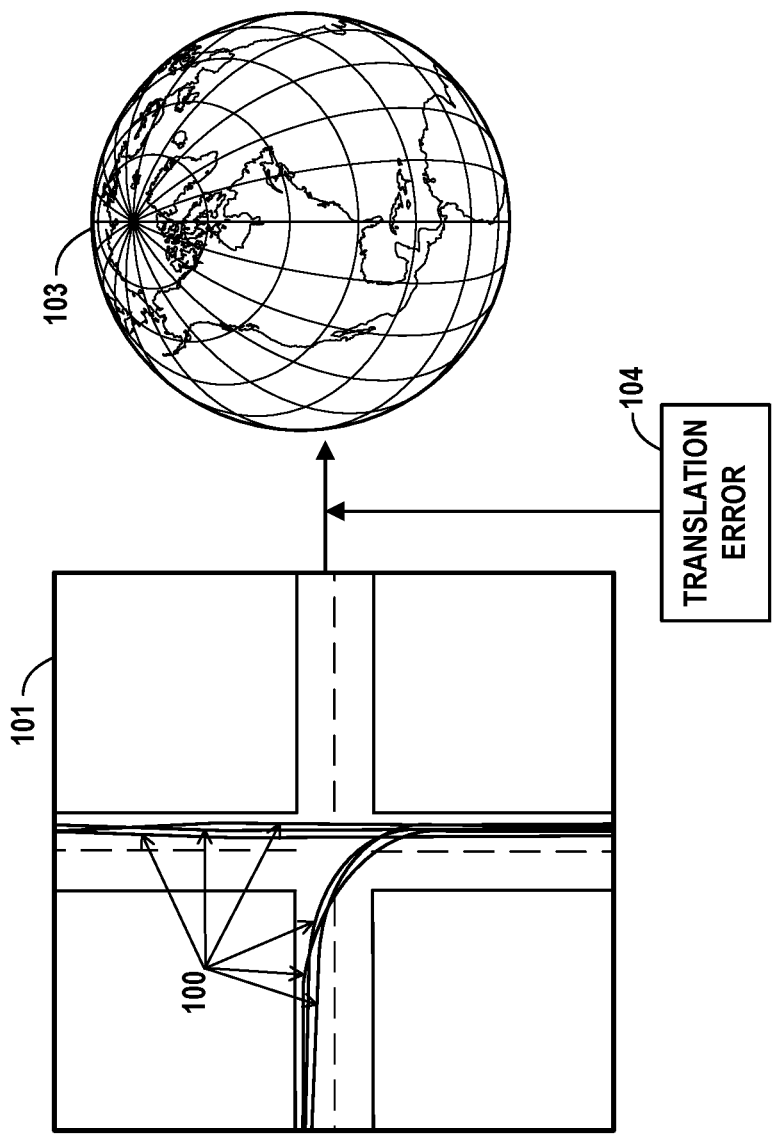
FIG. 1B is a diagram that illustrates one example of translating the set of vehicle trajectories of FIG. 1A from the local coordinate frame to a global coordinate frame.
Figure 1C:
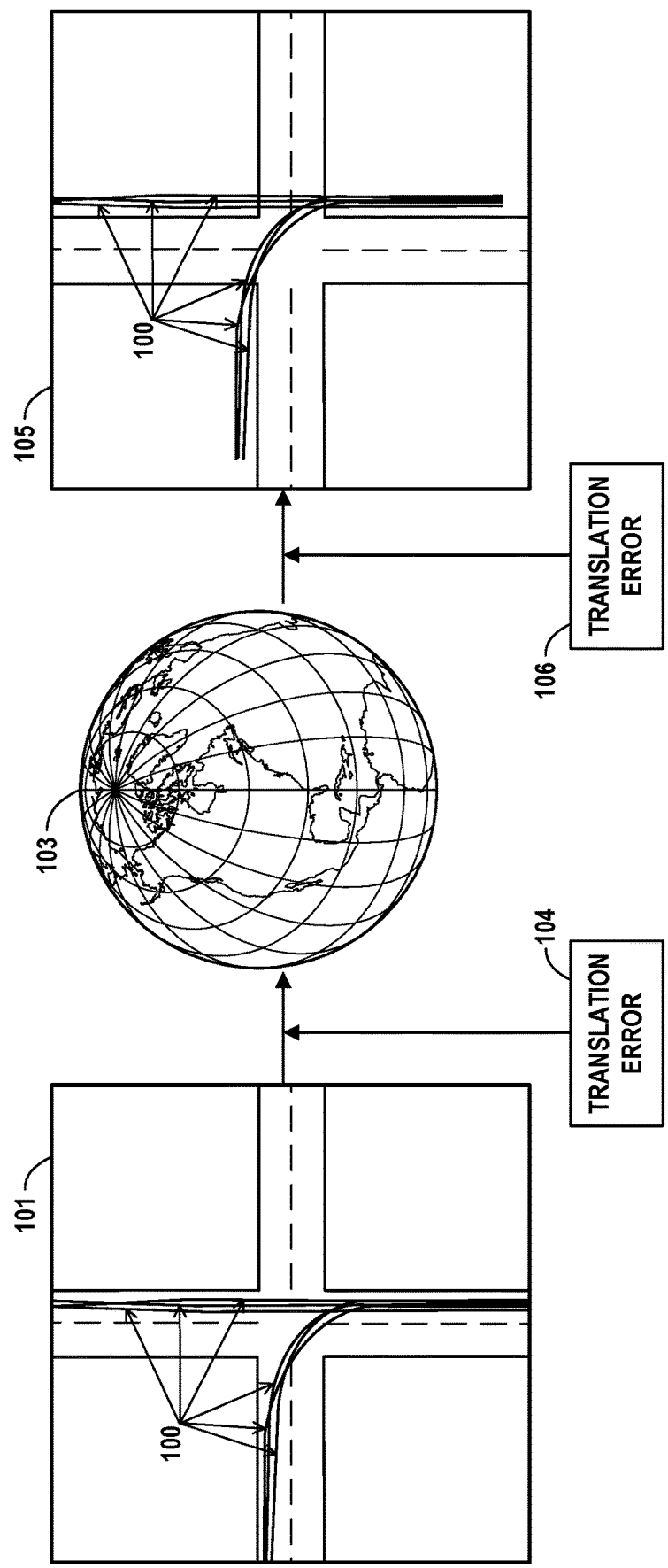
FIG. 1C is a diagram that illustrates one example of translating the set of vehicle trajectories of FIGS. 1A-1B from the global coordinate frame to a different local coordinate frame.

One possible example of the problems that may arise from such an approach is illustrated in FIGS. 1A-1C. As shown in FIG. 1A, a given set of vehicle trajectories 100 within a geographic area have been derived from source data captured by a fleet 102 of sensor-equipped vehicles equipped with a first type of sensor system (e.g., a camera-based sensor system), and these derived vehicle trajectories 100 are each represented according to a source-specific coordinate system defined by a first map 101 of the geographic area that is associated with the first type of sensor system (e.g., a camera-based map).

At some point after the vehicle trajectories 100 have been derived, a use case may arise that requires such vehicle trajectories to be translated from their source-specific coordinate frame into a different destination coordinate frame. For example, there may be a desire to encode the vehicle trajectories 100 into a new map for the geographic area that has a different coordinate frame than the first map 101 (e.g., for use by on-board vehicle computing systems or by a transportation-matching platform). As another example, there may be a desire to use the vehicle trajectories 100 to help generate certain aspects (e.g., junction lanes) of a new map for the geographic area that has a different coordinate frame than the first map 101. Various other use cases that require the vehicle trajectories 100 to be translated from their source-specific coordinate frame into a different destination coordinate frame are possible as well.

When such a use case arises, the source-specific coordinate frame of the vehicle trajectories 100 may be determined, and a processing pipeline may then be constructed to translate the vehicle trajectories 100 from their source-specific coordinate frame into a destination coordinate frame using the two-step translation process described above. In this respect, the first step of this two-step translation process would involve translating location points along each of the vehicle trajectories 100 from the source-specific coordinate frame defined by the first map 101 to a global coordinate frame, so that the location points along each of the vehicle trajectories are represented according to this global reference frame. One specific example of this first translation step is illustrated in FIG. 1B, which shows that each vehicle trajectory's location points have been translated from the source-specific coordinate frame defined by the first map 101 to an ECEF coordinate frame 103. However, as illustrated in FIG. 1B, this first translation step has introduced a first translation error 104 into the given set of trajectories 100.

In turn, the second step of the two-step translation process would involve translating the location points along each of the vehicle trajectories 100 from the global coordinate frame to the destination coordinate frame. One specific example of this second translation step is illustrated in FIG. 1C, which shows that each vehicle trajectory's location points have been translated from the ECEF coordinate frame 103 to a designation coordinate system defined by a second map 105 of the geographic area (e.g., a LiDAR-based map). Further, as illustrated in FIG. 1C, this second translation step has introduced a second translation error 106 into the vehicle trajectories 100. In some situations, this second translation error 106 may serve to compound the first translation error 104 as well as introduce an additional component of error.

As a result of the first and second translation errors 104 and 106 being introduced during the two-step translation process, FIG. 1C shows that the location points of the vehicle trajectories 100 have been distorted by up to 1-3 meters, which makes several of the vehicle trajectories appear as though they are off the side of the road when represented in the coordinate frame of the second map 105. Unfortunately, in most cases, this level of distortion would make the vehicle trajectories 100 unusable for the purpose described above. For instance, if the goal is to encode the vehicle trajectories 100 into the second map 105 so that on-board computing systems of vehicles or a transportation-matching platform can subsequently use the vehicle trajectories 100 encoded within the second map 105, then using a translation process that could distort the vehicle trajectories 100 by up to 1-3 meters (and thus appear to be off the side of the road) when represented according to the second map's coordinate frame would not be acceptable. Likewise, if the goal is to use the vehicle trajectories 100 to help generate certain aspects of the second map 105, then depending on the desired resolution of second map 105, using a translation process that could distort the vehicle trajectories 100 by up to 1-3 meters when represented according to the second map's coordinate frame may not be acceptable.

In line with the discussion above, deriving the vehicle trajectories 100 that are represented according to the source-specific coordinate frame defined by the first map 101 may have other drawbacks as well. For example, each time a use case arises for the vehicle trajectories 100 involving translation to a different coordinate frame, a new processing pipeline may need to be constructed in order to translate the vehicle trajectories 100 from the source-specific coordinate frame to a destination coordinate frame via an intermediate global coordinate frame, which may introduce inefficiencies that increase the time and cost required to leverage the vehicle trajectories 100 for the purposes described above. As another example, it is possible that the first map 101 could subsequently undergo changes that impact its coordinate frame, which could potentially invalidate the vehicle trajectories 100 that are represented according to that coordinate frame.

In view of these and other problems with existing approaches for collecting prior agent trajectories, disclosed herein is a new framework for deriving and storing agent trajectories that are represented according to a source-agnostic coordinate frame as opposed to a source-specific coordinate frame. Trajectories derived and stored in this way may be referred to herein as "source-agnostic agent trajectories." Importantly, this disclosed framework may be used to derive agent trajectories from source data that is captured by any of various different types of sensor systems having different degrees of accuracy, including but not limited to telematics-only sensor systems, camera-based sensor systems, and LiDAR-based sensor systems, and yet these derived agent trajectories will all be represented according to one common, source-agnostic coordinate frame that is not tied to any particular sensor system or source-specific map projection, and which maintains the known distribution of measurement error associated with the agent trajectories. In accordance with the disclosed framework, the source-agnostic agent trajectories that are derived from source data captured by these different types of sensor systems may then be stored together in a single repository, which may be referred to herein as a "source-agnostic trajectory database," and this repository of source-agnostic agent trajectories can then be used for any of the purposes noted above—including but not limited to encoding path priors into maps for use by vehicles and transportation-matching platforms, generating other aspects of maps, and/or creating machine learning models.

According to one possible implementation of the disclosed framework, the source-agnostic coordinate frame according to which the derived agent trajectories are represented may take the form of an ECEF coordinate frame that originates at the center of the Earth and rotates with the Earth, which provides a coordinate frame in which points can be accurately represented on the real-world curvature of the Earth's surface. In such an implementation, the disclosed framework for deriving a source-agnostic agent trajectory that is represented according to an ECEF coordinate frame may involve (i) a first set of functions for ingesting sensor data that is indicative of an agent's location, applying a localization technique to the sensor data in order to generate location data for the agent that is represented according to a local coordinate frame (e.g., a map coordinate frame), and then translating the agent's location data from the local coordinate frame to an ECEF coordinate frame, (ii) a second set of functions for ingesting sensor data that is indicative of an agent's motion and then applying techniques for separating the agent's motion from the motion of the Earth (e.g., by removing the effects of the Earth's magnetic and gravitational fields) in order to generate motion data for the agent that is represented according to the ECEF coordinate frame, and (iii) a third set of functions for combining the agent's location data and the agent's motion data into a trajectory for the agent that is represented according to the ECEF coordinate frame.

The disclosed framework for deriving agent trajectories that are represented according to a source-agnostic coordinate frame may provide various advantages over approaches for deriving agent trajectories that are represented according to different source-specific coordinate frames. One such advantage of the disclosed framework is that, by deriving agent trajectories that are represented according to a source-agnostic coordinate frame, and which include information regarding the distribution of measurement error associated with the agent trajectories, the disclosed framework avoids the need to use the two-step process discussed above in order to translate agent trajectories into a destination coordinate frame, which may significantly reduce the translation error introduced into the agent trajectories. Indeed, by deriving agent trajectories that are represented according to a source-agnostic coordinate frame, this eliminates any translation error that may otherwise be introduced when agent trajectories are translated from a source-specific coordinate frame to a global coordinate frame, and additionally eliminates the possibility of this source-to-global translation error becoming compounded during the translation from the global coordinate frame to the destination frame.

Another advantage of the disclosed framework is that, by deriving agent trajectories that are all represented according to a source-agnostic coordinate frame regardless of source and then storing these agent trajectories in a single repository, this may improve a consumer's ability to quickly and efficiently access and begin using the agent trajectories for their desired purpose. Indeed, because the agent trajectories derived using the disclosed framework are represented according to a source-agnostic reference frame as opposed to source-specific coordinate frames, there will no longer be a need to perform an initial evaluation of which source-specific coordinate frames are used to represent the agent trajectories or to construct separate processing pipelines for each of the different source-specific coordinate frames.

Yet another advantage of the disclosed framework is that, by deriving agent trajectories that are represented according to a source-agnostic coordinate frame instead of a source-specific coordinate frame, this may insulate the agent trajectories against later changes to source-specific coordinate frames that may otherwise have the potential to invalidate the agent trajectories.

The disclosed framework for deriving agent trajectories that are represented according to a source-agnostic coordinate frame may provide various other advantages as well.

One example of the disclosed framework for deriving and storing agent trajectories that are represented according to a source-agnostic coordinate frame will now be generally described with reference to FIG. 2. At a high level, the framework shown in FIG. 2 may begin with the collection of sensor data by one or more sensor-equipped vehicles. In this regard, various sensor-equipped vehicles equipped with various different types of sensor systems can be used to capture the sensor data from which the trajectories are derived.

Figure 2:
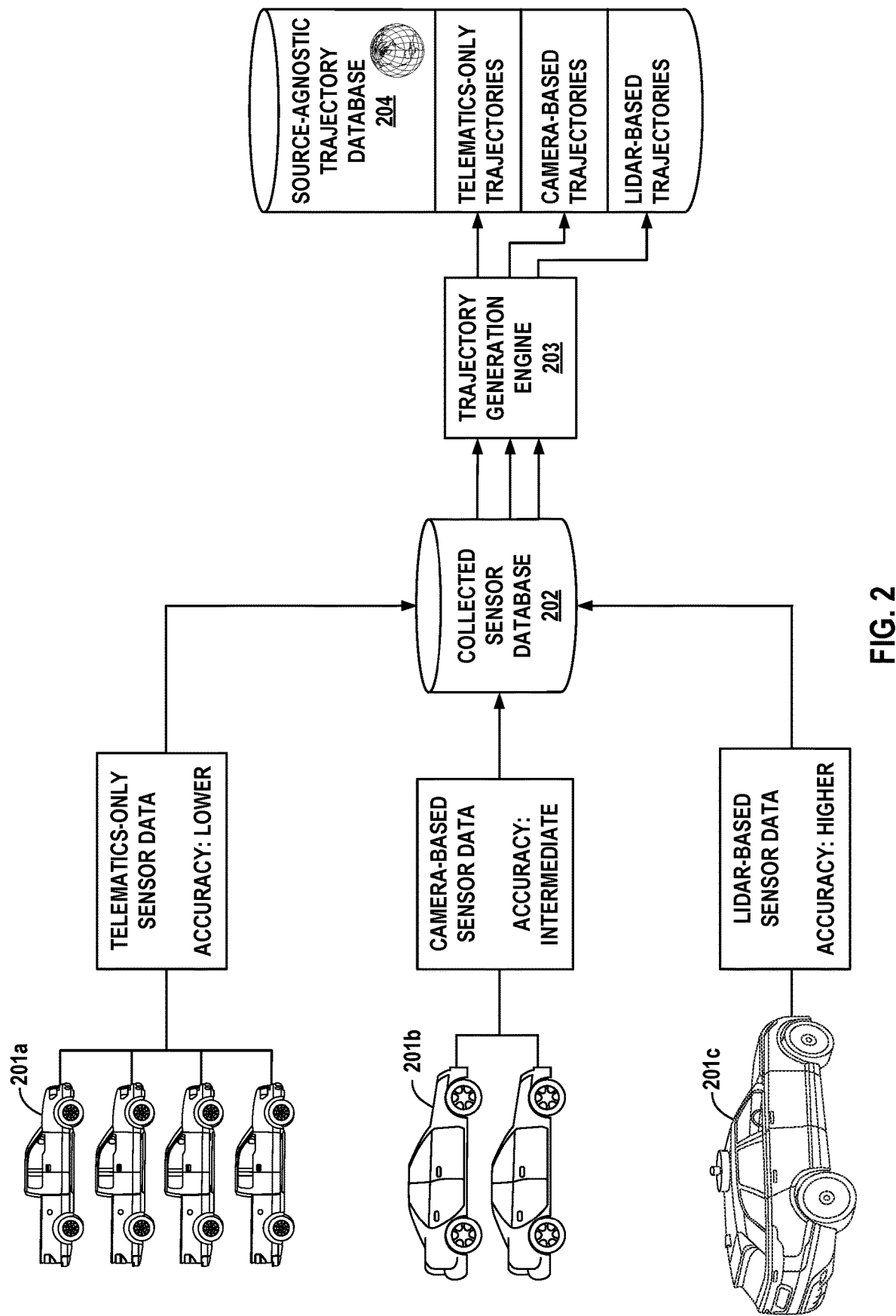
FIG. 2 is a diagram that illustrates one example of a framework that incorporates the disclosed technique for deriving and storing agent trajectories that are represented according to a source-agnostic coordinate frame.

For example, FIG. 2 illustrates a first type of vehicle 201a that is equipped with a telematics-only sensor system that captures telematics data. As noted above, although the telematics-only data captured by a telematics-only sensor system is generally considered to have a lower degree of accuracy than the sensor data captured by other types of sensor systems discussed herein when used for purposes of deriving trajectories, such telematics-only sensor systems are very widely available and thus very large collections of such telematics-only sensor data may be obtained from a plurality of different vehicles similar to vehicle 201a, as reflected in FIG. 2. In this respect, this telematics-only sensor data may be used to derive large volumes of trajectories, which can then be analyzed collectively (e.g., through aggregation techniques) in order to help achieve at least some of the purposes noted above.

As another example, FIG. 2 illustrates a second type of vehicle 201b that is equipped with a camera-based sensor system that captures both image and telematics data. Although such camera-based sensor systems may be relatively less widely available than a telematics-only system (e.g., relatively fewer vehicles may be equipped similar to vehicle 201b), the sensor data captured by the camera-based sensor system of vehicle 201b is generally considered to have a relatively higher degree of accuracy when used for purposes of deriving trajectories. In relation to the other type if sensor system discussed herein, a camera-based sensor system may be referred to as having an intermediate degree of accuracy.

As still another example, FIG. 2 illustrates a third vehicle 201c that is equipped with a LiDAR-based sensor system that captures a combination of LiDAR, image, and telematics data. As noted above, the sensor data captured by a LiDAR-based sensor system is generally considered to be highly accurate when used for purposes of deriving trajectories. However, due to the cost of outfitting a vehicle with such a LiDAR-based sensor system, the availability of LiDAR-based sensor data is typically limited in both volume and geographic scope.

As noted above, the different sensor systems of the example sensor-equipped vehicles shown in FIG. 2 each capture sensor data that is represented according to a different spatial reference frame that is specific to the sensor(s) being used (e.g., a LiDAR frame for LiDAR data, a camera frame for camera data, etc.). Further, each sensor of the different sensor systems, including different sensors of the same vehicle, may operate according to its own temporal reference frame that is based on the sensor's own individual clock. For instance, a LiDAR-based sensor system may produce LiDAR data that is associated with a set of timestamps generated by the LiDAR unit, image data that is associated with a different set of timestamps generated by the camera array, and telematics data that is associated with a still different set of timestamps generated by the telematics sensors.

Various other examples of sensor-equipped vehicles, including sensor-equipped vehicles with other types of sensor systems operating alone or in combination with the sensor systems discussed herein, are also possible.

As shown in FIG. 2, the sensor data collected by the one or more vehicles discussed above may be transferred to and stored in a collected sensor database 202, which may be included as part of an off-vehicle computing platform. In this regard, the transfer of the sensor data may involve communication over a data network, among other possibilities. In this regard, the collected sensor data may be stored in the collected sensor database 202 as raw sensor data that reflects the reference frame(s) in which the sensor data was collected. In particular, the collected sensor data from each sensor-equipped vehicle may reflect the sensor-specific spatial reference frame and the sensor-specific temporal reference frame in which it was collected.

Once the raw sensor data is compiled from the one or more sensor-equipped vehicles in the collected sensor database 202 in this way, a trajectory generation engine 203 may utilize the raw sensor data to generate trajectories that are expressed in relation to a source-agnostic coordinate frame (e.g., the ECEF coordinate frame). At a high level, this may involve using raw sensor data that has been captured by a sensor-equipped vehicle and stored in the collected sensor database 202 (which may include GPS data and perhaps also image data and/or LiDAR data) in order to generate location data for the vehicle that is represented according to a local coordinate frame (e.g., a coordinate frame associated with the collection vehicle's sensor system), and then translating the generated location data into the ECEF coordinate frame as well as a common temporal reference frame, such as Universal Coordinated Time (UTC). However, this translated location data may not accurately reflect the motion of the vehicle with respect to the curvature of the Earth, which means that using the translated location data alone to define the trajectory of the vehicle according to the ECEF coordinate frame would degrade the integrity of the vehicle's trajectory in a manner similar to that discussed above with respect to FIGS. 1A-1C.

For this reason, the trajectory generation engine 203 also uses raw sensor data that has been captured by the sensor-equipped vehicle and stored in the collected sensor database 202 (e.g., IMU data) in order to generate motion data for the vehicle that is represented according to the ECEF coordinate frame, which involves removing the effects of the Earth's gravitational and magnetic fields from the vehicle's motion. The trajectory generation engine 203 then combines the ECEF-based location data and the ECEF-based motion data for the vehicle into a derived trajectory for the vehicle that is represented according to the ECEF coordinate frame, and in this way that does not suffer from the same degradation in data integrity that is noted above. A more detailed discussion of each of these functions can be found below in relation to FIG. 3.

Because the ECEF-based trajectories derived by the trajectory generation engine 203 are represented according to the ECEF coordinate frame rather than the particular local coordinate frames associated with the sensor systems used to collect such trajectories, these ECEF-based trajectories may be referred to as source-agnostic trajectories. In addition, the ECEF-based trajectories may be derived in a way that incorporates information regarding the degree of accuracy associated with the sensor system that was sued to collect the sensor data or the trajectory. For example, ECEF-based trajectories that are derived based on telematics-only sensor data may be stored as telematics-only trajectories, ECEF-based trajectories that are derived based on camera-based sensor data may be stored as telematics-only trajectories, and so on. Accordingly, the trajectory generation engine 203 may store the derived ECEF-based trajectories in a source-agnostic trajectory database 204, as shown in FIG. 2, where they may be indexed based on their relative degree of accuracy (among numerous other indexing criteria) and leveraged for future use. As a result, downstream consumers of the source-agnostic trajectories need not perform the first step of the two-step translation process shown in FIG. 1C, wherein the trajectories are translated from a local coordinate frame to the ECEF coordinate frame. Further, the trajectories stored in the source-agnostic trajectory database 204 are each based on a more complete set of information regarding a sensor-equipped vehicle's motion with respect to the curvature of the Earth, which may not be included in other types of trajectories that are based solely on location information that is represented according to a local coordinate frame. Accordingly, the source-agnostic trajectories may be more widely usable for vehicle and transportation-matching platform operations, map generation, and/or model training, among other possibilities.

Figure 3A:
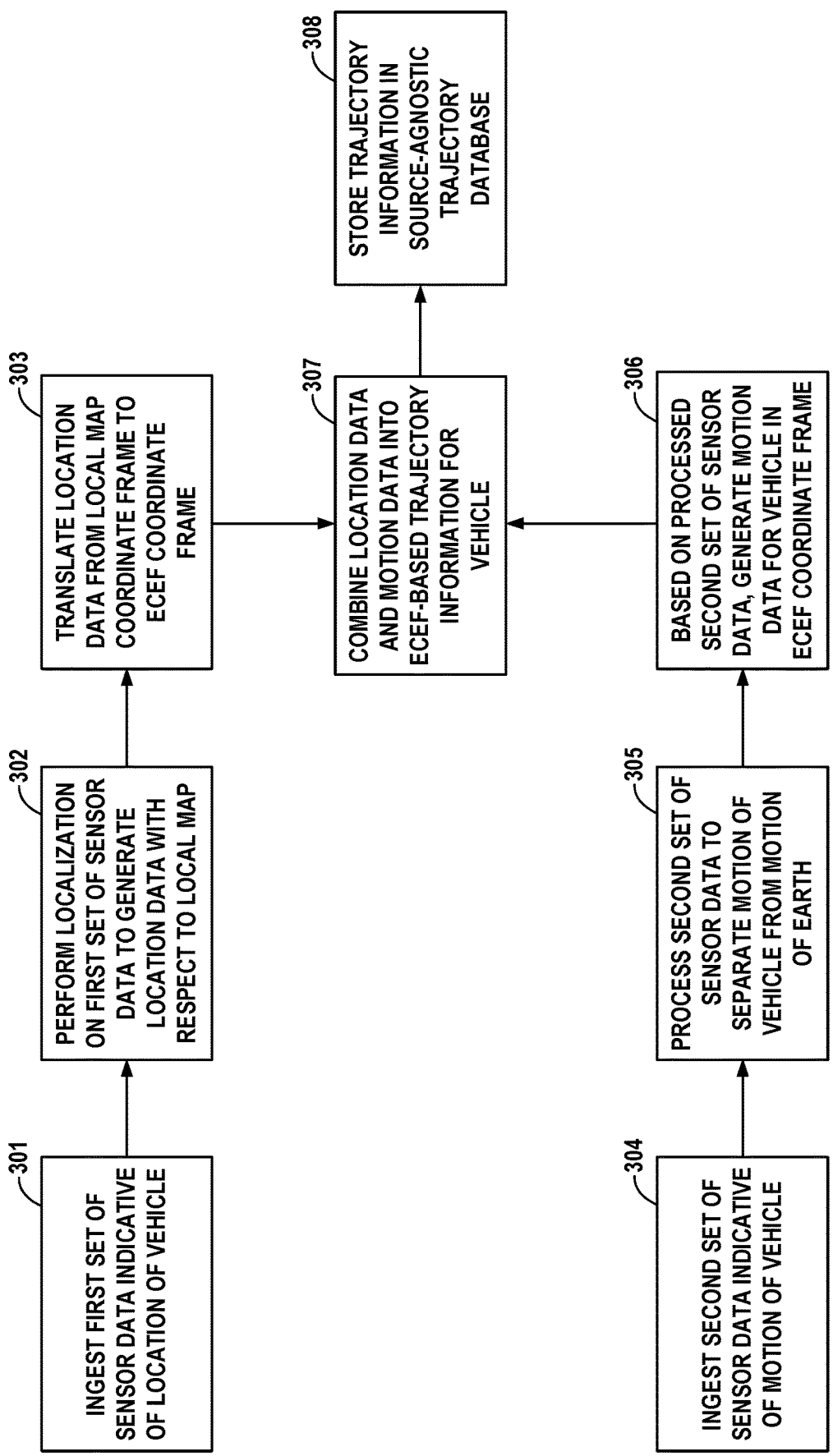
FIG. 3A is a functional block diagram that illustrates one example set of functions for deriving source-agnostic agent trajectories.

Turning now to FIG. 3, a functional block diagram is shown that illustrates an example pipeline of functions that may be performed by the trajectory generation engine 203 shown in FIG. 2 in order to derive a source-agnostic trajectory. Although FIG. 3 will generally focus on deriving source-agnostic trajectories for a sensor-equipped vehicle based on sensor data collected by the vehicle, it should be understood that source-agnostic trajectories may be derived for agents other than the vehicle as well. For instance, some types of captured sensor data (e.g., LiDAR data and/or image data) may provide an indication of the location and motion of other agents in the sensor-equipped vehicle's surrounding environment, and such captured sensor data could also be used by the trajectory generation engine 203 to derive source-agnostic trajectories for those other agents. Other examples are also possible.

As shown in FIG. 3, the example pipeline for generating a source-agnostic trajectory for a sensor-equipped vehicle initially involves two sets of functions: (i) a first set of functions 301-303 for deriving ECEF-based location data for the vehicle and (ii) a second set of functions 304-306 for deriving ECEF-based motion data for the vehicle. The outputs of these two sets of functions are then used in a third set of functions 307-308 to derive the source-agnostic trajectory for the vehicle and then store that derived trajectory in a source-agnostic trajectory database for future use. It should be understood that, although the first set of functions 301-303 and the second set of functions 304-306 are shown in parallel, they need not be performed simultaneously or in any particular order.

At block 301 of the example pipeline, the trajectory generation engine 203 ingests a first set of sensor data, captured by a sensor-equipped vehicle, that is indicative of the vehicle's location during a given period of time in the past. In this regard, the trajectory generation engine 203 may obtain the first set of sensor data from the collected sensor database 202 shown in FIG. 2. Further, depending on the type of sensor system utilized by the sensor-equipped vehicle, the first set of sensor data may take various forms and may be associated with different degrees of accuracy. For example, if the vehicle includes a telematics-only sensor system such as vehicle 201a, the first set of sensor data may be limited to GPS data that has a relatively lower degree of accuracy that is nonetheless suitable for numerous applications (e.g., meter-level precision). As another example, if the vehicle includes a camera-based sensor system such as vehicle 201b, the first set of sensor data may include image data in addition to GPS data, which may have an intermediate degree of accuracy that is relatively higher than telematic-only based sensor data. As still another example, if the vehicle includes a LiDAR-based sensor system such as vehicle 201c, the first set of sensor data may include LiDAR data, image data, and GPS data, which may have a relatively higher degree of accuracy in relation to the other sensor systems discussed herein (e.g., centimeter-level precision). Other examples of sensor-equipped vehicles having different sensor configurations and degrees of accuracy are also possible.

At block 302 of the example pipeline shown in FIG. 3, the trajectory generation engine 203 performs a localization technique on the first set of sensor data in order to generate location data (e.g., a time-sequence of location points) for the vehicle that is represented according to a local coordinate frame (e.g., a local coordinate frame of a map within which the vehicle is localized). In this regard, the particular localization technique and local coordinate frame may take various forms, which may depend again on the type of sensor system that is utilized by the vehicle.

For instance, if the first set of sensor data comprises GPS data collected by a telematics-only sensor system, a map-matching localization technique may be applied in order to localize the vehicle within a road-network map for the area in which the vehicle was operating and thereby generate location data for the vehicle that is represented according to the road-network map's local coordinate frame, having a degree of accuracy associated with a telematics-only sensor system.

As another possibility, if the first set of sensor data comprises a combination of image data and GPS data collected by a camera-based sensor system, a simultaneous location and mapping (SLAM) localization technique (e.g., visual SLAM) may be applied in order to localize the vehicle within an image-based map for the area in which the vehicle was operating (e.g. a map that was previously created based on image data for the area) and thereby generate location data for the vehicle that is represented according to the image-based map's local coordinate frame, having a degree of accuracy associated with a camera-based sensor system.

As still another possibility, if the first set of sensor data comprises a combination of LiDAR, image, and GPS data collected by a LiDAR-based sensor system, a SLAM localization technique may be applied in order to localize the vehicle within a LiDAR-based map for the area in which the vehicle was operating (e.g. a map that was previously created based on a LiDAR data for the area) and thereby generate location data for the vehicle that is represented according to the LiDAR-based map's local coordinate frame, having a degree of accuracy associated with a LiDAR-based sensor system.

The localization technique and local coordinate frame used at block 302 may take various other forms as well.

In some implementations, the localization of the first set of sensor data with respect to the local coordinate frame may also involve an adjustment to account for the positioning of the sensor system relative to the sensor-equipped vehicle. As one example, a camera-based sensor system might be mounted on the vehicle's dashboard at a position that is offset from the lateral center of the vehicle by a certain distance, in which case the location data that is generated based on the sensor data captured by the camera-based sensor system may be representative of the location of this off-centered sensor system rather than the lateral center of the vehicle itself. However, downstream applications tend to operate under an assumption that vehicle trajectories represent location in terms of the vehicles' lateral center. Thus, as part of the process of generating the location data for the vehicle, the trajectory generation engine 203 may also account for the lateral offset between the vehicle's sensor system and the lateral center of the vehicle. Other examples of adjusting the generated location data to account for the positioning of the sensor system relative to the vehicle are also possible.

At block 303, the trajectory generation engine 203 translates the generated location data for the vehicle from the local coordinate frame to an ECEF coordinate frame. The translation of the location data in this way may take various forms. For example, the translation between coordinate frames may involve identifying benchmarks, or anchor points, within a map's local coordinate frame that have known locations within the ECEF coordinate frame. In some implementations, such benchmarks may include semantic features within the map such as traffic signals, road boundaries, and the like. Using the known benchmarks, a set of location points from the generated location data that are in proximity to the benchmarks in the map's local coordinate frame are identified and then placed within the ECEF coordinate frame at a position that maintains the geospatial relationship of each location point with the benchmarks. Then, using the position of the identified location points placed within the ECEF coordinate frame in combination with the spatial relationship between the location points in the local coordinate frame, the remaining location points from the generated location data can then be placed in the ECEF coordinate frame. Other techniques for translating location data from a local coordinate frame and the ECEF coordinate frame are also possible.

As noted above, the translation of the location data from the local coordinate frame to the ECEF coordinate frame generally results in a loss of data integrity. One reason for this loss in data integrity is that a local coordinate frame generally does not represent the world in a way that captures the true curvature of the Earth's surface. For instance, many types of local coordinate frames (e.g., map projections) are represented as a planar surface. While this representation may be sufficient for some tasks, such as vehicle routing and navigation on a local scale, location data for a vehicle that is represented in a local coordinate frame of this kind does not include a complete picture of the vehicle's movement on the Earth's curved surface. As a result, location data that is represented in a local coordinate frame and then translated to the ECEF coordinate frame is generally lacking this information.

To address this shortcoming, the example pipeline shown in FIG. 3 includes the second set of functions as noted above. Beginning at block 304, the trajectory generation engine 203 ingests a second set of sensor data, captured by the sensor-equipped vehicle, that is indicative of the vehicle's motion during the given period of time in the past. As noted above with respect to block 301, the second set of sensor data may also be obtained by the trajectory generation engine 203 from the collected sensor database 202 shown in FIG. 2. Further, as with the first set of senor data, the second set of sensor data may take various forms. As one example, the second set of sensor data may comprise sensor data captured by one or more motion sensors of the vehicle, such as a six-axis IMU, and may include accelerometer data indicating accelerations of the vehicle's sensor system and gyroscope data indicating angular rotations of the vehicle's sensor system during the given period of time in the past. The second set of sensor data may take other forms as well.

At block 305, the trajectory generation engine 203 processes the second set of sensor data in order to isolate the motion of the vehicle during the given period of time in the past. In this respect, one aspect of isolating the motion of the vehicle may involve separating the motion of the vehicle from the motion of the Earth by determining the effects of the Earth's magnetic and gravitational fields of the vehicle's motion sensor(s) and then removing those effects from the second set of sensor data.

Figure 3B:
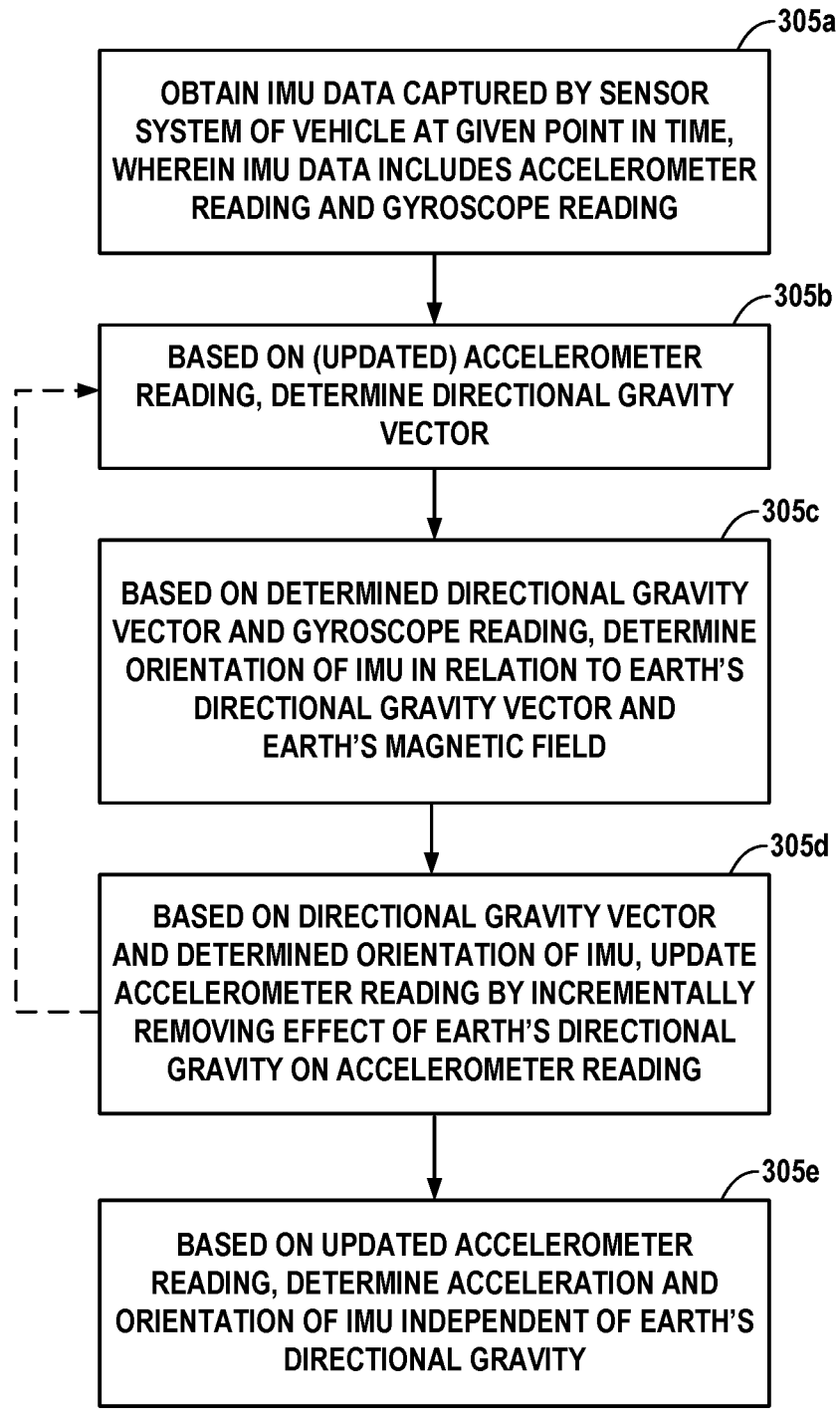
FIG. 3B is a functional block diagram that illustrates one example set of functions for separating the motion of a vehicle from the motion of the Earth.

Isolating the motion of the vehicle in this way may take various forms, an example of which is shown in FIG. 3B. Beginning at block 305a, the trajectory generation engine 203 may obtain IMU data that was captured by a sensor system of the vehicle at a given point in time. As noted above, the snapshot of IMU data may include an accelerometer reading as well as a gyroscope reading. At block 305b, the trajectory generation engine 203 may determine the Earth's directional gravity based on the reading of the vehicle's accelerometer for the snapshot of IMU data. At block 305c, the trajectory generation engine 203 may use the determined directional gravity and the corresponding gyroscope reading to determine (i) an orientation of the vehicle's sensor system with respect to the Earth's magnetic field as well as (ii) an orientation of the vehicle's sensor system with respect to the Earth's gravitational field. Both orientations may be represented as direction vectors.

At block 305d, the trajectory generation engine 203 may then remove the effect of the Earth's gravity from the accelerometer reading of the vehicle's sensor system, and thereby update the accelerometer reading of the IMU. This may involve rotating the sensor system in the direction of the Earth's directional gravity vector, beginning from the determined orientation of the IMU with respect to the Earth's directional gravity vector. However, because the effect of the Earth's gravity on the vehicle's sensor system will typically be substantially greater than the effect of the vehicle's own motion, the effect of the Earth's gravity may be removed incrementally to ensure that the effect of the vehicle's own motion is not lost. In this respect, and as indicated by the dashed line in FIG. 3B, one or more optimization algorithms (e.g. a gradient descent algorithm) may be used to iterate through the steps of determining the orientation of the vehicle's sensor system with respect to the Earth's gravitational and magnetic fields, rotating the sensor system in the direction of the gravitational field to update the accelerometer reading and remove a portion of the Earth's gravitational effects, and then repeating these steps until the orientation and acceleration values converge, which may represent the orientation and acceleration values of the vehicle's sensor system independent of the Earth's gravitational and magnetic fields at a given point in time that corresponds to the given snapshot of IMU data. Accordingly, at block 305e, the trajectory generation engine 203 may determine the acceleration and orientation of the vehicle's sensor system independent of the Earth's gravitational field. These functions may then be repeated for each snapshot of IMU data in the second set of sensor data. Separating the effects of the Earth's motion from the motion of the vehicle may be carried out in other manners as well.

Depending on the type of sensor system, it may also be possible that the vehicle's sensor system could have engaged in movement relative to the vehicle itself during the given period of time. For example, if the sensor system comprises a telematics-only or camera-based sensor system that is embodied in the form of a smartphone or the like, it is possible that this sensor system may move around within the vehicle (e.g. as a result of actions by a driver or sudden movements by the vehicle). In this respect, another aspect of the function of isolating the motion of the vehicle may involve processing the second set of sensor data in order to separate the motion of the vehicle itself from the relative motion of the sensor system within the vehicle. This processing may involve using one or more optimization algorithms to iterate through the steps of estimating the location of the sensor system within the vehicle and estimating the relative movement of the sensor system within the vehicle.

At block 306, the trajectory generation engine 203 may use the processed second set of sensor data to generate motion data for the vehicle that is represented according to the ECEF coordinate frame. This ECEF-based motion data may take various forms. As one example, such ECEF-based motion data may comprise a time-sequence of motion states for the vehicle that each includes a measure of the relative position, orientation, velocity, and acceleration of the vehicle at a respective point in time during the given period of time in the past.

In practice, this ECEF-based motion data for the vehicle may be highly-accurate locally, on the order of centimeter-level precision, such that relatively minor changes to the vehicle's motion are reflected. In this way, the ECEF-based motion data that is generated for the vehicle may incorporate the motion of the vehicle with respect to the curvature of the Earth's surface that is missing when translated location data alone (which does not consider such information) is used to define a vehicle's trajectory.

Once the trajectory generation engine 203 has derived both ECEF-based location data and ECEF-based motion data for the vehicle, the trajectory generation engine 203 may carry out the third set of functions noted above. For instance, at block 307, the trajectory generation engine 203 may combine the vehicle's ECEF-based location data and ECEF-based motion data into a derived trajectory for the vehicle that is represented in the ECEF coordinate frame, which may take the form of a time-sequence of states for the vehicle that may each include a measure of the vehicle's location, orientation, velocity, and acceleration in the ECEF coordinate frame. In this respect, the derived trajectory provides a representation of the real-world location and motion of the vehicle that is defined in terms of a coordinate frame that properly accounts for the Earth's curved surface.

Combining the location data and the motion data in this way may take various forms. As one example, combining the two components of the generated trajectory data may involve inputting the location data and motion data into one or more optimization algorithms, examples of which may include an extended Kalman filter and an unscented Kalman filter. Numerous other optimization processes are also possible.

At block 308, once the ECEF-based location data and the ECEF-based motion data are used to derive an ECEF-based trajectory for the vehicle, the trajectory generation engine 203 may store the ECEF-based trajectory in a source-agnostic trajectory database, such as the source-agnostic trajectory database 204 shown in FIG. 2. The ECEF-based trajectory stored within the source-agnostic trajectory database 204 may be associated with various other related information, all of which may be indexed such that it may be queried by downstream consumers of the trajectory data. For instance, each ECEF-based trajectory that is derived by the trajectory generation engine 203 may be assigned a unique identifier. As another possibility, each derived ECEF-based trajectory may be associated with an indication of the vehicle for which the trajectory was derived, the given period of time in the past for which the trajectory was derived, the particular sensor system that was used to capture the sensor data for the trajectory, the degree of accuracy associated with the particular sensor system, and/or the types of sensor data that were used to derive the trajectory, among numerous other examples. As yet another possibility, each derived ECEF-based trajectory may be associated with an indication of the local coordinate frame that was used during the course of deriving the trajectory. The information included in the source-agnostic trajectory database 204 may take other forms as well.

After source-agnostic trajectories have been derived and stored in the source-agnostic database 204 using the disclosed framework discussed herein, those trajectories may be used for various purposes, including but not limited to the purposes noted above. For instance, as one possibility, prior agent trajectories can be encoded as pre-processed information about the world (e.g., encoded as map data) that is made available to on-board computing systems of vehicles (e.g., vehicles equipped with autonomy systems and/or advanced driver assistance systems), and these encoded prior agent trajectories (which may sometimes be referred to as "path priors") may then be used by the vehicle's on-board computing system in various manners while the vehicle is operating in a real-world environment. For example, to the extent that a vehicle's on-board computing system has access to map data encoded with prior vehicle trajectories for the road on which the vehicle is currently traveling, the vehicle's on-board computing system may use those prior vehicle trajectories during a planning operation in order to derive a behavior plan for the vehicle that is informed by how other vehicles have historically traversed that same road, during a prediction operation in order to help predict the future behavior of agents surrounding the ego vehicle, and/or during a perception operation in order to help validate the on-board computing system's detection of the agents surrounding the vehicle.

As another possibility, prior agent trajectories can be used to help generate other aspects of a map that may subsequently be used by a vehicle's on-board computing system when performing operations such as localization, perception, prediction, and/or planning, one example of which may include geospatial information about the lanes within a mapped area.

As yet another possibility, prior agent trajectories can be used to help create machine learning models that are subsequently used by a vehicle's on-board computing system to carry out its perception, prediction, and/or planning operations. For example, prior agent trajectories may be used as training data for machine learning models that may be used by a vehicle's on-board computing system to predict the future trajectories of agents detected by the vehicle's on-board computing system. As another example, prior agent trajectories may be used to identify and generate data characterizing past occurrences of certain scenario types of interest (e.g., a "cut-in" scenario where another agent cuts in front of an ego vehicle, an "unprotected left" scenario where a vehicle makes an unprotected left turn at an intersection, a "pedestrian ahead" scenario where a pedestrian is in a vehicle's field of view, etc.), and such data may in turn be used as training data for machine learning models that may be used by a vehicle's on-board computing system to predict which scenario types of interest (if any) are being perceived by the vehicle.

Prior agent trajectories can also be used in other ways to help facilitate operations carried out by a vehicle's on-board computing system.

As yet another possibility, prior trajectories of vehicles and/or other types of agents in the real world can be encoded as pre-processed information about the world (e.g., encoded as map data) that is made available to a transportation-matching platform that is configured to match individuals interested in obtaining transportation (i.e., "transportation requestors") with vehicles capable of providing such transportation. The transportation matching platform may use map data encoded with prior agent trajectories to help improve the transportation-matching platform's understanding of how agents typically move within an area, which may then improve the transportation-matching platform's ability to perform various operations—including but not limited to matching requestors with available vehicles within the area, generating the most optimal routes for vehicles to follow when picking up and/or transporting requestors within the area, determining pickup and drop-off locations, providing accurate estimates of pickup and drop-off times within the area, and/or effectively pre-positioning vehicles within the area in anticipation of responding to transportation-matching requests, among other possibilities.

As still a further possibility, these source-agnostic trajectories may be accessed and used to test the performance of a given version of autonomy-system software (e.g., via simulations or the like). In addition to the foregoing, these source-agnostic trajectories may also be accessed and used in software applications that allow for visualization and editing of such trajectories, which may facilitate some or all of the other uses noted above.

In addition, the degree of accuracy associated with the source-agnostic trajectories—which may be derived based on the type of sensor system that was used to collect the trajectories, as noted above—may be taken into account when accessing and using the source-agnostic trajectories. For instance, the degree of accuracy may be used as a basis to determine which trajectories to retrieve and use from the database, and/or as a basis for how to weigh trajectories having different degrees of accuracy relative to one another when they are used together.

One example use case for the source-agnostic trajectories that are derived and stored in accordance with the present disclosure will now be described with reference to FIGS. 4A-4D, which illustrate an example pipeline for using source-agnostic trajectories to generate geometry information for junction lanes that are to be encoded into a map being built for use by on-board computing systems of vehicles and/or transportation matching platforms. In this regard, the functions of the example pipeline may be carried out by a computing platform that is engaged in the map creation process, among other possibilities.

Beginning at block 401 shown in FIG. 4A, the computing platform may obtain source-agnostic trajectories for a given geographic area that is relevant to the map that is being built (e.g., by accessing a source-agnostic database). The source-agnostic trajectories that are relevant to the map may be identified in various ways, such as by generating a geospatial query of the source-agnostic trajectory database 204 that identifies the given geographic area (e.g., a set of coordinates that define the boundary of the area of interest, a zip code, city name, etc.).

As another possibility, a query to identify the source-agnostic trajectories that are relevant to the map may request agent trajectories having a given degree of accuracy. For instance, a query may request agent trajectories for the given geographic area that are tagged with the source-agnostic trajectory database 204 has having a relatively high degree of accuracy, such as agent trajectories derived based on sensor data collected by a LiDAR-based sensor system. If such highly accurate agent trajectories are available, even in small number, they may be used as a basis to generate the geometry information for junction lanes. Alternatively, the source-agnostic trajectory database 204 may contain only agent trajectories that are based on sensor data collected by a telematic-only sensor system, which may be relatively less accurate but far more abundant. Accordingly, such agent trajectories may be analyzed collectively (e.g., through aggregation techniques) to generate the geometry information for junction lanes. It should also be understood that agent trajectories having different degrees of accuracy may also be used in combination—e.g., a large number of relatively less accurate agent trajectories may be used to validate the geometry information that is generate based on a small number of relatively more accurate agent trajectories. Numerous other possibilities also exist.

One possible example of the function of obtaining source-agnostic trajectories for a given geographic area that is relevant to the map that is being built is illustrated in FIG. 4A. As shown in FIG. 4A, an example set of trajectories 400 has been identified and obtained from the source-agnostic trajectory database 204.

The function of obtaining source-agnostic trajectories for a given geographic area that is relevant to the map that is being built may take other forms as well.

Figure 4B:
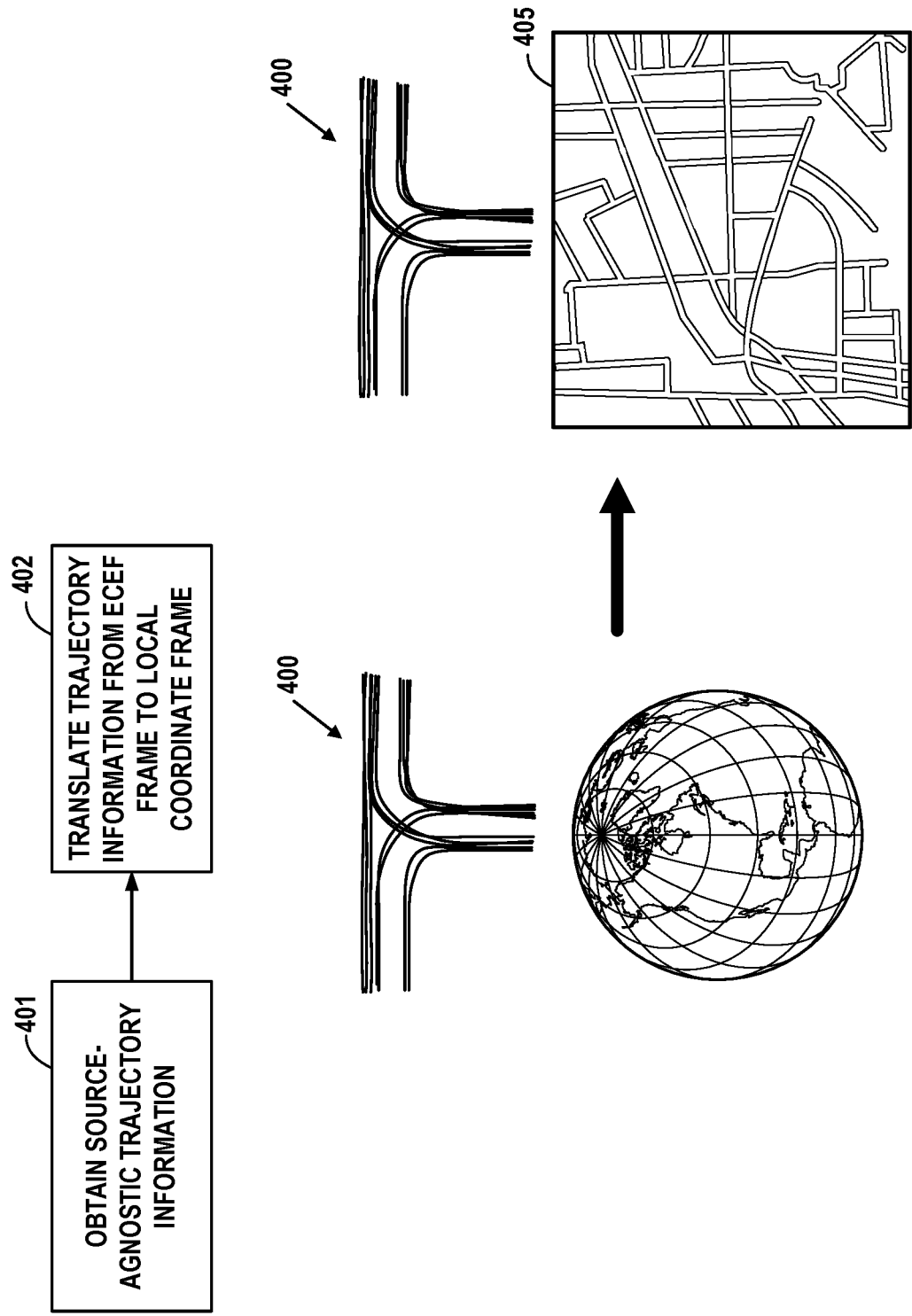
FIG. 4B is a diagram that illustrates one example of translating the source-agnostic trajectories of FIG. 4A to a map's local coordinate frame.

Moving to FIG. 4B, at block 402, the computing platform may translate the obtained source-agnostic trajectories 400 from their source-agnostic coordinate frame to a local coordinate frame of the map that is being built.

The translation of the trajectories in this way may take various forms, and may be similar to the translation discussed above in relation to block 303 shown in FIG. 3 For example, the translation may involve identifying benchmarks within the ECEF coordinate frame that have known locations in the local coordinate frame. In some implementations, such benchmarks may include semantic features within the map such as traffic signals, road boundaries, and the like. Using the known benchmarks, the trajectories may be translated to the local coordinate frame at a position that maintains the geospatial relationship of the trajectories with the benchmarks. Other techniques for translating location data from a local coordinate frame and the ECEF coordinate frame are also possible.

As discussed above, translating trajectories between the source-agnostic coordinate frame and the map's local coordinate frame may introduce some degree of translation error into the trajectories. However, in the example shown in FIGS. 4A-4D, the computing platform engaged in the map creation process may generally have access to the information that defines the error that is introduced when translating between ECEF and the map's local coordinate frame. Therefore, this information may be used to compensate for and/or offset the introduced error.

One possible example of the function of translating the obtained source-agnostic trajectories from their source-agnostic coordinate frame to a map's local coordinate frame is illustrated in FIG. 4B. As shown in FIG. 4B, the example set of trajectories 400 have been translated from an ECEF coordinate frame to a local coordinate frame of a map 405.

The function of translating the obtaining source-agnostic trajectories from their source-agnostic coordinate frame to a map's local coordinate frame may take other forms as well.

Figure 4C:
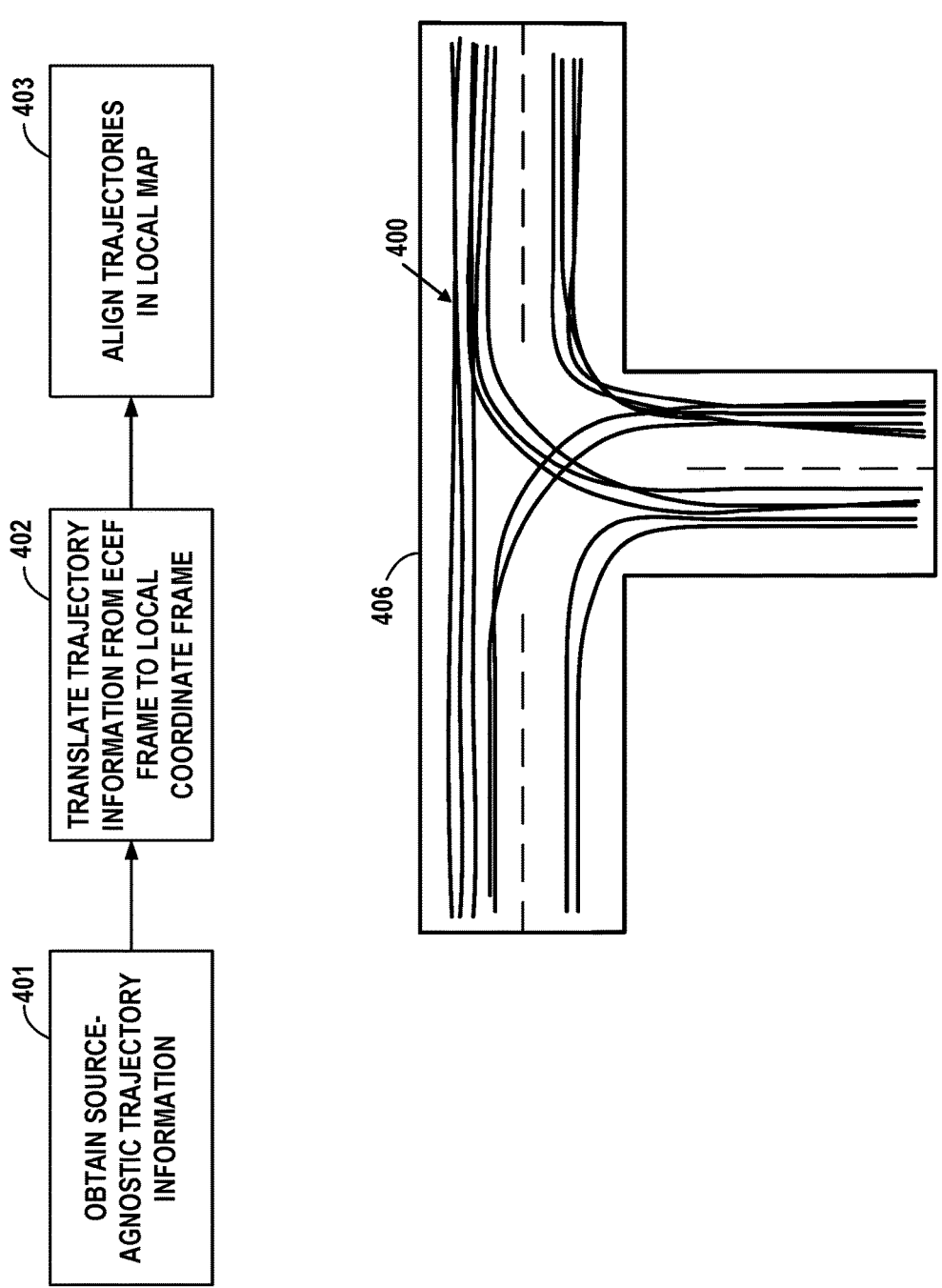
FIG. 4C is a diagram that illustrates one example of placing the translated trajectories of FIG. 4B into a local map.

Turning next to FIG. 4C, at block 403, the computing platform may align the translated trajectories within the map that is being built. This function of aligning the translated trajectories within the map may take various forms. As one possibility, the function of aligning the translated trajectories within the map may involve analyzing semantic information that has already been encoded into the map, such as semantic information about lanes, traffic lights, traffic signs, or the like, in order align the trajectories within the map.

One possible example of the function of aligning the translated trajectories within the map is illustrated in FIG. 4C. As shown in FIG. 4C, after the set of trajectories 400 have been translated from the ECEF coordinate frame to the local coordinate frame of map 405, semantic information that has already been encoded into map 405 may be used to align the set of trajectories 400 within map 405. In particular, the translated set of trajectories 400 have been aligned within the map such that they are positioned at a roadway junction 406 of the local map 405 that includes a "T" intersection.

As a result, and as shown in FIG. 4C, the set of trajectories 400 provides an indication of how various vehicles have previously navigated the junction 406 in local map 405. Accordingly, the set of trajectories 400 can be used to help determine the geospatial location of the lane boundaries within the junction 406, which may not otherwise be apparent from pavement markings or other visible indicators.

The function of aligning the translated trajectories within the map may take other forms as well.

Figure 4D:
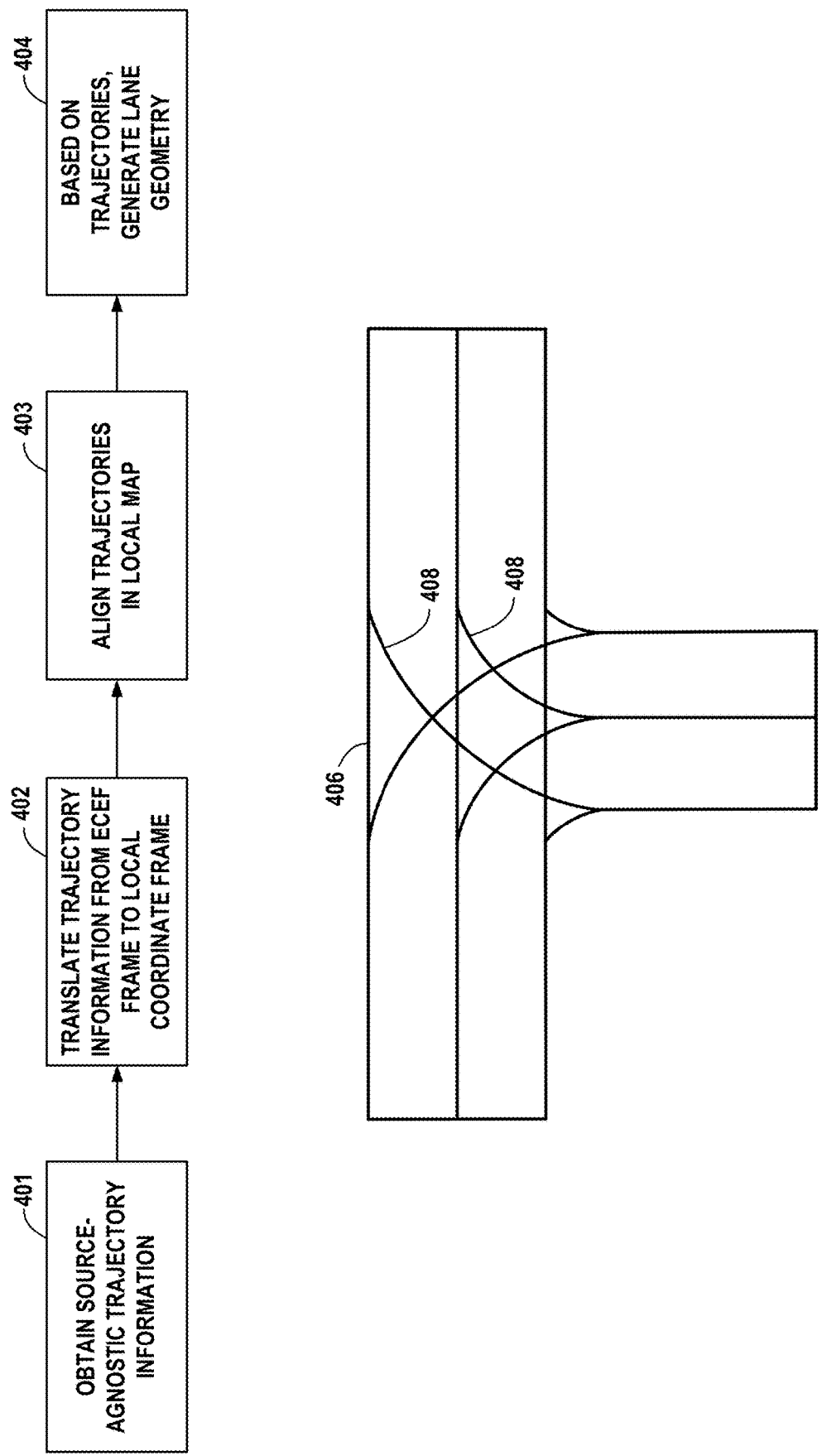
FIG. 4D is a diagram that illustrates one example of generating lane geometries for the local map of FIG. 4C based on the trajectories.

Turning to FIG. 4D, at block 404, the computing platform may generate lane geometry information based on the translated trajectories. This function of generating the lane geometry information based on the translated trajectories may take various forms. As one possibility, the computing platform may use the translated trajectories to identify the connections between the lanes for the road segments that intersect at a lane junction, and may then use previously-created lane geometry information for these segment lanes as a basis for defining the geometry of the junction lanes. As another possibility, the computing platform may aggregate different clusters of translated trajectories together into aggregated trajectories and may then use these aggregated trajectories as a basis for defining the geometry of the junction lanes.

One possible example of the function of generating lane geometry information based on the translated trajectories is illustrated in FIG. 4D. As shown in FIG. 4D, the translated set of trajectories 400 have been used to define lane boundaries 408 for four different lanes within the junction 406.

The function of generating lane geometry information based on the translated trajectories may take other forms as well.

After generating the lane geometry information based on the translated trajectories, that information may then be encoded into the map being built, which may subsequently be used for various purposes. For example, an on-board computing system of a vehicle that is operating within the junction 406 may utilize the encoded lane geometry information to inform the on-board computing system's localization perception, prediction, and/or planning operations. As another example, a transportation-matching platform may use the encoded lane geometry information to assist in the determination of ETA estimates and/or route planning operations, among other possibilities.

The foregoing framework for deriving and storing agent trajectories that are represented according to a source-agnostic coordinate frame may be used in various other scenarios, and for various other purposes as well.

As noted above, although various different types of sensor systems may be utilized to collect the sensor data that is utilized in the disclosed framework, one possible use of the derived source-agnostic trajectories is to facilitate autonomous operation of a vehicle. In view of this, one possible example of such a vehicle will now be discussed in greater detail.

Figure 5:
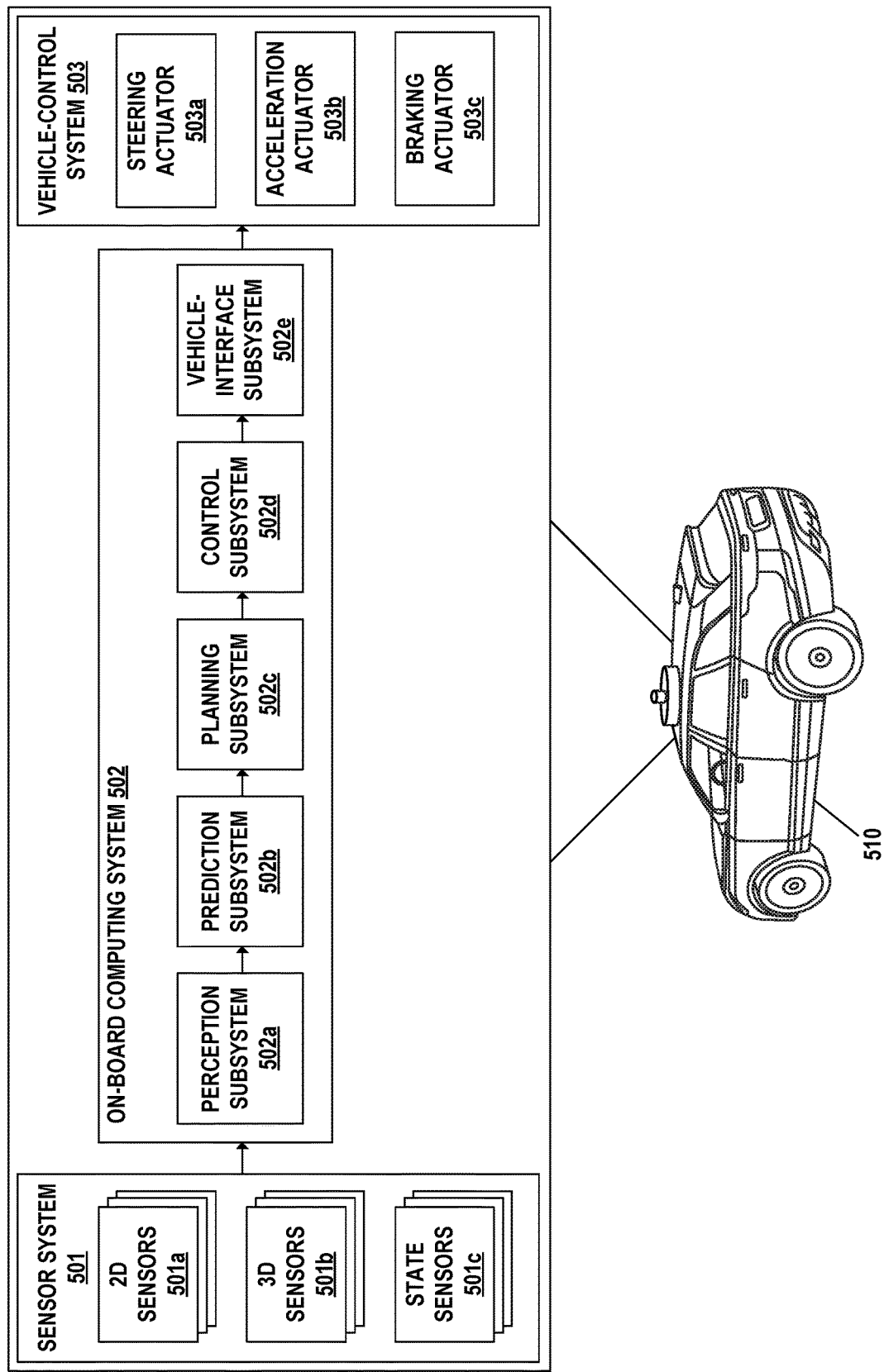
FIG. 5 is a simplified block diagram that illustrates certain systems that may be included in an example vehicle.

Turning now to FIG. 5, a simplified block diagram is provided to illustrate certain systems that may be included in an example vehicle 500. As shown, at a high level, vehicle 500 may include at least (i) a sensor system 501 that is configured to capture sensor data that is representative of the real-world environment being perceived by the vehicle (i.e., the collection vehicle's "surrounding environment") and/or the collection vehicle's operation within that real-world environment, (ii) an on-board computing system 502 that is configured to perform functions related to autonomous operation of vehicle 500 (and perhaps other functions as well), and (iii) a vehicle-control system 503 that is configured to control the physical operation of vehicle 500, among other possibilities. Each of these systems may take various forms.

In general, sensor system 501 may comprise any of various different types of sensors, each of which is generally configured to detect one or more particular stimuli based on vehicle 500 operating in a real-world environment. The sensors then output sensor data that is indicative of one or more measured values of the one or more stimuli at one or more capture times (which may each comprise a single instant of time or a range of times).

For instance, as one possibility, sensor system 501 may include one or more 2D sensors 501a that are each configured to capture 2D sensor data that is representative of the vehicle's surrounding environment. Examples of 2D sensor(s) 501a may include a single 2D camera, a 2D camera array, a 2D RADAR unit, a 2D SONAR unit, a 2D ultrasound unit, a 2D scanner, and/or 2D sensors equipped with visible-light and/or infrared sensing capabilities, among other possibilities. Further, in an example implementation, 2D sensor(s) 501a may have an arrangement that is capable of capturing 2D sensor data representing a 360° view of the vehicle's surrounding environment, one example of which may take the form of an array of 6-7 cameras that each have a different capture angle. Other 2D sensor arrangements are also possible.

As another possibility, sensor system 501 may include one or more 3D sensors 501b that are each configured to capture 3D sensor data that is representative of the vehicle's surrounding environment. Examples of 3D sensor(s) 501b may include a LiDAR unit, a 3D RADAR unit, a 3D SONAR unit, a 3D ultrasound unit, and a camera array equipped for stereo vision, among other possibilities. Further, in an example implementation, 3D sensor(s) 501b may comprise an arrangement that is capable of capturing 3D sensor data representing a 360° view of the vehicle's surrounding environment, one example of which may take the form of a LiDAR unit that is configured to rotate 360° around its installation axis. Other 3D sensor arrangements are also possible.

As yet another possibility, sensor system 501 may include one or more state sensors 501c that are each configured capture sensor data that is indicative of aspects of the vehicle's current state, such as the vehicle's current position, current orientation (e.g., heading/yaw, pitch, and/or roll), current velocity, and/or current acceleration of vehicle 500. Examples of state sensor(s) 501c may include an IMU (which may be comprised of accelerometers, gyroscopes, and/or magnetometers), an Inertial Navigation System (INS), a Global Navigation Satellite System (GNSS) unit such as a GPS unit, among other possibilities.

Sensor system 501 may include various other types of sensors as well.

In turn, on-board computing system 502 may generally comprise any computing system that includes at least a communication interface, a processor, and data storage, where such components may either be part of a single physical computing device or be distributed across a plurality of physical computing devices that are interconnected together via a communication link. Each of these components may take various forms.

For instance, the communication interface of on-board computing system 502 may take the form of any one or more interfaces that facilitate communication with other systems of vehicle 500 (e.g., sensor system 501, vehicle-control system 503, etc.) and/or remote computing systems (e.g., a transportation-matching system), among other possibilities. In this respect, each such interface may be wired and/or wireless and may communicate according to any of various communication protocols, examples of which may include Ethernet, Wi-Fi, Controller Area Network (CAN) bus, serial bus (e.g., Universal Serial Bus (USB) or Firewire), cellular network, and/or short-range wireless protocols.

Further, the processor of on-board computing system 502 may comprise one or more processor components, each of which may take the form of a general-purpose processor (e.g., a microprocessor), a special-purpose processor (e.g., an application-specific integrated circuit, a digital signal processor, a graphics processing unit, a vision processing unit, etc.), a programmable logic device (e.g., a field-programmable gate array), or a controller (e.g., a microcontroller), among other possibilities.

Further yet, the data storage of on-board computing system 502 may comprise one or more non-transitory computer-readable mediums, each of which may take the form of a volatile medium (e.g., random-access memory, a register, a cache, a buffer, etc.) or a non-volatile medium (e.g., read-only memory, a hard-disk drive, a solid-state drive, flash memory, an optical disk, etc.), and these one or more non-transitory computer-readable mediums may be capable of storing both (i) program instructions that are executable by the processor of on-board computing system 502 such that on-board computing system 502 is configured to perform various functions related to the autonomous operation of vehicle 500 (among other possible functions), and (ii) data that may be obtained, derived, or otherwise stored by on-board computing system 502.

In one embodiment, on-board computing system 502 may also be functionally configured into a number of different subsystems that are each tasked with performing a specific subset of functions that facilitate the autonomous operation of vehicle 500, and these subsystems may be collectively referred to as the vehicle's "autonomy system." In practice, each of these subsystems may be implemented in the form of program instructions that are stored in the on-board computing system's data storage and are executable by the on-board computing system's processor to carry out the subsystem's specific subset of functions, although other implementations are possible as well—including the possibility that different subsystems could be implemented via different hardware components of on-board computing system 502.

As shown in FIG. 5, in one embodiment, the functional subsystems of on-board computing system 502 may include (i) a perception subsystem 502*a* that generally functions to derive a representation of the surrounding environment being perceived by vehicle 500, (ii) a prediction subsystem 502*b* that generally functions to predict the future state of each object detected in the vehicle's surrounding environment, (iii) a planning subsystem 502*c* that generally functions to derive a behavior plan for vehicle 500, (iv) a control subsystem 502*d* that generally functions to transform the behavior plan for vehicle 500 into control signals for causing vehicle 500 to execute the behavior plan, and (v) a vehicle-interface subsystem 502*e* that generally functions to translate the control signals into a format that vehicle-control system 503 can interpret and execute. However, it should be understood that the functional subsystems of on-board computing system 502 may take various other forms as well. Each of these example subsystems will now be described in further detail below.

For instance, the subsystems of on-board computing system 502 may begin with perception subsystem 502*a*, which may be configured to fuse together various different types of "raw" data that relate to the vehicle's perception of its surrounding environment and thereby derive a representation of the surrounding environment being perceived by vehicle 500. In this respect, the "raw" data that is used by perception subsystem 502*a* to derive the representation of the vehicle's surrounding environment may take any of various forms.

For instance, at a minimum, the "raw" data that is used by perception subsystem 502*a* may include multiple different types of sensor data captured by sensor system 501, such as 2D sensor data (e.g., image data) that provides a 2D representation of the vehicle's surrounding environment, 3D sensor data (e.g., LiDAR data) that provides a 3D representation of the vehicle's surrounding environment, and/or state data for vehicle 500 that indicates the past and current position, orientation, velocity, and acceleration of vehicle 500. Additionally, the "raw" data that is used by perception subsystem 502*a* may include map data associated with the vehicle's location, such as high-definition geometric and/or semantic map data, which may be preloaded onto on-board computing system 502 and/or obtained from a remote computing system. Additionally yet, the "raw" data that is used by perception subsystem 502*a* may include navigation data for vehicle 500 that indicates a specified origin and/or specified destination for vehicle 500, which may be obtained from a remote computing system (e.g., a transportation-matching system) and/or input by a human riding in vehicle 500 via a user-interface component that is communicatively coupled to on-board computing system 502. Additionally still, the "raw" data that is used by perception subsystem 502*a* may include other types of data that may provide context for the vehicle's perception of its surrounding environment, such as weather data and/or traffic data, which may be obtained from a remote computing system. The "raw" data that is used by perception subsystem 502*a* may include other types of data as well.

Advantageously, by fusing together multiple different types of raw data (e.g., both 2D sensor data and 3D sensor data), perception subsystem 502*a* is able to leverage the relative strengths of these different types of raw data in a way that may produce a more accurate and precise representation of the surrounding environment being perceived by vehicle 500.

Further, the function of deriving the representation of the surrounding environment perceived by vehicle 500 using the raw data may include various aspects. For instance, one aspect of deriving the representation of the surrounding environment perceived by vehicle 500 using the raw data may involve determining a current state of vehicle 500 itself, such as a current position, a current orientation, a current velocity, and/or a current acceleration, among other possibilities. In this respect, perception subsystem 502a may also employ a localization technique such as SLAM to assist in the determination of the vehicle's current position and/or orientation. (Alternatively, it is possible that on-board computing system 502 may run a separate localization service that determines position and/or orientation values for vehicle 500 based on raw data, in which case these position and/or orientation values may serve as another input to perception subsystem 502a).

Another aspect of deriving the representation of the surrounding environment perceived by vehicle 500 using the raw data may involve detecting objects within the vehicle's surrounding environment, which may result in the determination of class labels, bounding boxes, or the like for each detected object. In this respect, the particular classes of objects that are detected by perception subsystem 502a (which may be referred to as "agents") may take various forms, including both (i) "dynamic" objects that have the potential to move, such as vehicles, cyclists, pedestrians, and animals, among other examples, and (ii) "static" objects that generally do not have the potential to move, such as streets, curbs, lane markings, traffic lights, stop signs, and buildings, among other examples. Further, in practice, perception subsystem 502a may be configured to detect objects within the vehicle's surrounding environment using any type of object detection model now known or later developed, including but not limited object detection models based on convolutional neural networks (CNN).

Yet another aspect of deriving the representation of the surrounding environment perceived by vehicle 500 using the raw data may involve determining a current state of each object detected in the vehicle's surrounding environment, such as a current position (which could be reflected in terms of coordinates and/or in terms of a distance and direction from vehicle 500), a current orientation, a current velocity, and/or a current acceleration of each detected object, among other possibilities. In this respect, the current state of each detected object may be determined either in terms of an absolute measurement system or in terms of a relative measurement system that is defined relative to a state of vehicle 500, among other possibilities.

The function of deriving the representation of the surrounding environment perceived by vehicle 500 using the raw data may include other aspects as well.

Further yet, the derived representation of the surrounding environment perceived by vehicle 500 may incorporate various different information about the surrounding environment perceived by vehicle 500, examples of which may include (i) a respective set of information for each object detected in the vehicle's surrounding, such as a class label, a bounding box, and/or state information for each detected object, (ii) a set of information for vehicle 500 itself, such as state information and/or navigation information (e.g., a specified destination), and/or (iii) other semantic information about the surrounding environment (e.g., time of day, weather conditions, traffic conditions, etc.). The derived representation of the surrounding environment perceived by vehicle 500 may incorporate other types of information about the surrounding environment perceived by vehicle 500 as well.

Still further, the derived representation of the surrounding environment perceived by vehicle 500 may be embodied in various forms. For instance, as one possibility, the derived representation of the surrounding environment perceived by vehicle 500 may be embodied in the form of a data structure that represents the surrounding environment perceived by vehicle 500, which may comprise respective data arrays (e.g., vectors) that contain information about the objects detected in the surrounding environment perceived by vehicle 500, a data array that contains information about vehicle 500, and/or one or more data arrays that contain other semantic information about the surrounding environment. Such a data structure may be referred to as a "parameter-based encoding."

As another possibility, the derived representation of the surrounding environment perceived by vehicle 500 may be embodied in the form of a rasterized image that represents the surrounding environment perceived by vehicle 500 in the form of colored pixels. In this respect, the rasterized image may represent the surrounding environment perceived by vehicle 500 from various different visual perspectives, examples of which may include a "top down" view and a "bird's eye" view of the surrounding environment, among other possibilities. Further, in the rasterized image, the objects detected in the surrounding environment of vehicle 500 (and perhaps vehicle 500 itself) could be shown as color-coded bitmasks and/or bounding boxes, among other possibilities.

The derived representation of the surrounding environment perceived by vehicle 500 may be embodied in other forms as well.

As shown, perception subsystem 502a may pass its derived representation of the vehicle's surrounding environment to prediction subsystem 502b. In turn, prediction subsystem 502b may be configured to use the derived representation of the vehicle's surrounding environment (and perhaps other data) to predict a future state of each object detected in the vehicle's surrounding environment at one or more future times (e.g., at each second over the next 5 seconds)—which may enable vehicle 500 to anticipate how the real-world objects in its surrounding environment are likely to behave in the future and then plan its behavior in a way that accounts for this future behavior.

Prediction subsystem 502b may be configured to predict various aspects of a detected object's future state, examples of which may include a predicted future position of the detected object, a predicted future orientation of the detected object, a predicted future velocity of the detected object, and/or predicted future acceleration of the detected object, among other possibilities. In this respect, if prediction subsystem 502b is configured to predict this type of future state information for a detected object at multiple future times, such a time sequence of future states may collectively define a predicted future trajectory of the detected object. Further, in some embodiments, prediction subsystem 502b could be configured to predict multiple different possibilities of future states for a detected object (e.g., by predicting the 3 most-likely future trajectories of the detected object). Prediction subsystem 502b may be configured to predict other aspects of a detected object's future behavior as well.

In practice, prediction subsystem 502b may predict a future state of an object detected in the vehicle's surrounding environment in various manners, which may depend in part on the type of detected object. For instance, as one possibility, prediction subsystem 502b may predict the future state of a detected object using a data science model that is configured to (i) receive input data that includes one or more derived representations output by perception subsystem 502a at one or more perception times (e.g., the "current" perception time and perhaps also one or more prior perception times), (ii) based on an evaluation of the input data, which includes state information for the objects detected in the vehicle's surrounding environment at the one or more perception times, predict at least one likely time sequence of future states of the detected object (e.g., at least one likely future trajectory of the detected object), and (iii) output an indicator of the at least one likely time sequence of future states of the detected object. This type of data science model may be referred to herein as a "future-state model."

Such a future-state model will typically be created by an off-board computing system (e.g., a backend platform) and then loaded onto on-board computing system 502, although it is possible that a future-state model could be created by on-board computing system 502 itself. Either way, the future-state model may be created using any modeling technique now known or later developed, including but not limited to a machine-learning technique that may be used to iteratively "train" the data science model to predict a likely time sequence of future states of an object based on training data. The training data may comprise both test data (e.g., historical representations of surrounding environments at certain historical perception times) and associated ground-truth data (e.g., historical state data that indicates the actual states of objects in the surrounding environments during some window of time following the historical perception times).

Prediction subsystem 502b could predict the future state of a detected object in other manners as well. For instance, for detected objects that have been classified by perception subsystem 502a as belonging to certain classes of static objects (e.g., roads, curbs, lane markings, etc.), which generally do not have the potential to move, prediction subsystem 502b may rely on this classification as a basis for predicting that the future state of the detected object will remain the same at each of the one or more future times (in which case the state-prediction model may not be used for such detected objects). However, it should be understood that detected objects may be classified by perception subsystem 502a as belonging to other classes of static objects that have the potential to change state despite not having the potential to move, in which case prediction subsystem 502b may still use a future-state model to predict the future state of such detected objects. One example of a static object class that falls within this category is a traffic light, which generally does not have the potential to move but may nevertheless have the potential to change states (e.g. between green, yellow, and red) while being perceived by vehicle 500.

After predicting the future state of each object detected in the surrounding environment perceived by vehicle 500 at one or more future times, prediction subsystem 502b may then either incorporate this predicted state information into the previously-derived representation of the vehicle's surrounding environment (e.g., by adding data arrays to the data structure that represents the surrounding environment) or derive a separate representation of the vehicle's surrounding environment that incorporates the predicted state information for the detected objects, among other possibilities.

As shown, prediction subsystem 502b may pass the one or more derived representations of the vehicle's surrounding environment to planning subsystem 502c. In turn, planning subsystem 502c may be configured to use the one or more derived representations of the vehicle's surrounding environment (and perhaps other data) to derive a behavior plan for vehicle 500, which defines the desired driving behavior of vehicle 500 for some future period of time (e.g., the next 5 seconds).

The behavior plan that is derived for vehicle 500 may take various forms. For instance, as one possibility, the derived behavior plan for vehicle 500 may comprise a planned trajectory for vehicle 500 that specifies a planned state of vehicle 500 at each of one or more future times (e.g., each second over the next 5 seconds), where the planned state for each future time may include a planned position of vehicle 500 at the future time, a planned orientation of vehicle 500 at the future time, a planned velocity of vehicle 500 at the future time, and/or a planned acceleration of vehicle 500 (whether positive or negative) at the future time, among other possible types of state information. As another possibility, the derived behavior plan for vehicle 500 may comprise one or more planned actions that are to be performed by vehicle 500 during the future window of time, where each planned action is defined in terms of the type of action to be performed by vehicle 500 and a time and/or location at which vehicle 500 is to perform the action, among other possibilities. The derived behavior plan for vehicle 500 may define other planned aspects of the vehicle's behavior as well.

Further, in practice, planning subsystem 502c may derive the behavior plan for vehicle 500 in various manners. For instance, as one possibility, planning subsystem 502c may be configured to derive the behavior plan for vehicle 500 by (i) deriving a plurality of different "candidate" behavior plans for vehicle 500 based on the one or more derived representations of the vehicle's surrounding environment (and perhaps other data), (ii) evaluating the candidate behavior plans relative to one another (e.g., by scoring the candidate behavior plans using one or more cost functions) in order to identify which candidate behavior plan is most desirable when considering factors such as proximity to other objects, velocity, acceleration, time and/or distance to destination, road conditions, weather conditions, traffic conditions, and/or traffic laws, among other possibilities, and then (iii) selecting the candidate behavior plan identified as being most desirable as the behavior plan to use for vehicle 500. Planning subsystem 502c may derive the behavior plan for vehicle 500 in various other manners as well.

After deriving the behavior plan for vehicle 500, planning subsystem 502c may pass data indicating the derived behavior plan to control subsystem 502d. In turn, control subsystem 502d may be configured to transform the behavior plan for vehicle 500 into one or more control signals (e.g., a set of one or more command messages) for causing vehicle 500 to execute the behavior plan. For instance, based on the behavior plan for vehicle 500, control subsystem 502d may be configured to generate control signals for causing vehicle 500 to adjust its steering in a specified manner, accelerate in a specified manner, and/or brake in a specified manner, among other possibilities.

As shown, control subsystem 502d may then pass the one or more control signals for causing vehicle 500 to execute the behavior plan to vehicle-interface subsystem 502e. In turn, vehicle-interface subsystem 502e may be configured to translate the one or more control signals into a format that can be interpreted and executed by components of vehicle-control system 503. For example, vehicle-interface subsystem 502e may be configured to translate the one or more control signals into one or more control messages are defined according to a particular format or standard, such as a CAN bus standard and/or some other format or standard that is used by components of vehicle-control system 503.

In turn, vehicle-interface subsystem 502e may be configured to direct the one or more control signals to the appropriate control components of vehicle-control system 503. For instance, as shown, vehicle-control system 503 may include a plurality of actuators that are each configured to control a respective aspect of the vehicle's physical operation, such as a steering actuator 503a that is configured to control the vehicle components responsible for steering (not shown), an acceleration actuator 503b that is configured to control the vehicle components responsible for acceleration such as a throttle (not shown), and a braking actuator 503c that is configured to control the vehicle components responsible for braking (not shown), among other possibilities. In such an arrangement, vehicle-interface subsystem 502e of on-board computing system 502 may be configured to direct steering-related control signals to steering actuator 503a, acceleration-related control signals to acceleration actuator 503b, and braking-related control signals to braking actuator 503c. However, it should be understood that the control components of vehicle-control system 503 may take various other forms as well.

Notably, the subsystems of on-board computing system 502 may be configured to perform the above functions in a repeated manner, such as many times per second, which may enable vehicle 500 to continually update both its understanding of the surrounding environment and its planned behavior within that surrounding environment.

Although not specifically shown, it should be understood that vehicle 500 includes various other systems and components as well, including but not limited to a propulsion system that is responsible for creating the force that leads to the physical movement of vehicle 500.

Turning now to FIG. 6, a simplified block diagram is provided to illustrate one example of a transportation-matching platform 600 that functions to match individuals interested in obtaining transportation from one location to another with transportation options, such as vehicles that are capable of providing the requested transportation. As shown, transportation-matching platform 600 may include at its core a transportation-matching system 601, which may be communicatively coupled via a communication network 606 to (i) a plurality of client stations of individuals interested in transportation (i.e., "transportation requestors"), of which client station 602 of transportation requestor 603 is shown as one representative example, (ii) a plurality of vehicles that are capable of providing the requested transportation, of which vehicle 604 is shown as one representative example, and (iii) a plurality of third-party systems that are capable of providing respective subservices that facilitate the platform's transportation matching, of which third-party system 605 is shown as one representative example.

Broadly speaking, transportation-matching system 601 may include one or more computing systems that collectively comprise a communication interface, at least one processor, data storage, and executable program instructions for carrying out functions related to managing and facilitating transportation matching. These one or more computing systems may take various forms and be arranged in various manners. For instance, as one possibility, transportation-matching system 601 may comprise computing infrastructure of a public, private, and/or hybrid cloud (e.g., computing and/or storage clusters). In this respect, the entity that owns and operates transportation-matching system 601 may either supply its own cloud infrastructure or may obtain the cloud infrastructure from a third-party provider of "on demand" computing resources, such as Amazon Web Services (AWS), Microsoft Azure, Google Cloud, Alibaba Cloud, or the like. As another possibility, transportation-matching system 601 may comprise one or more dedicated servers. Other implementations of transportation-matching system 601 are possible as well.

As noted, transportation-matching system 601 may be configured to perform functions related to managing and facilitating transportation matching, which may take various forms. For instance, as one possibility, transportation-matching system 601 may be configured to receive transportation requests from client stations of transportation requestors (e.g., client station 602 of transportation requestor 603) and then fulfill such transportation requests by dispatching suitable vehicles, which may include vehicle 604. In this respect, a transportation request from client station 602 of transportation requestor 603 may include various types of information.

For example, a transportation request from client station 602 of transportation requestor 603 may include specified pick-up and drop-off locations for the transportation. As another example, a transportation request from client station 602 of transportation requestor 603 may include an identifier that identifies transportation requestor 603 in transportation-matching system 601, which may be used by transportation-matching system 601 to access information about transportation requestor 603 (e.g., profile information) that is stored in one or more data stores of transportation-matching system 601 (e.g., a relational database system), in accordance with the transportation requestor's privacy settings. This transportation requestor information may take various forms, examples of which include profile information about transportation requestor 603. As yet another example, a transportation request from client station 602 of transportation requestor 603 may include preferences information for transportation requestor 603, examples of which may include vehicle-operation preferences (e.g., safety comfort level, preferred speed, rates of acceleration or deceleration, safety distance from other vehicles when traveling at various speeds, route, etc.), entertainment preferences (e.g., preferred music genre or playlist, audio volume, display brightness, etc.), temperature preferences, and/or any other suitable information.

As another possibility, transportation-matching system 601 may be configured to access information related to a requested transportation, examples of which may include information about locations related to the transportation, traffic data, route options, optimal pick-up or drop-off locations for the transportation, and/or any other suitable information associated with requested transportation. As an example and not by way of limitation, when transportation-matching system 601 receives a request for transportation from San Francisco International Airport (SFO) to Palo Alto, California, system 601 may access or generate any relevant information for this particular transportation request, which may include preferred pick-up locations at SFO, alternate pick-up locations in the event that a pick-up location is incompatible with the transportation requestor (e.g., the transportation requestor may be disabled and cannot access the pick-up location) or the pick-up location is otherwise unavailable due to construction, traffic congestion, changes in pick-up/drop-off rules, or any other reason, one or more routes to travel from SFO to Palo Alto, preferred off-ramps for a type of transportation requestor, and/or any other suitable information associated with the transportation.

In some embodiments, portions of the accessed information could also be based on historical data associated with historical transportation facilitated by transportation-matching system 601. For example, historical data may include aggregate information generated based on past transportation information, which may include any information described herein and/or other data collected by sensors affixed to or otherwise located within vehicles (including sensors of other computing devices that are located in the vehicles such as client stations). Such historical data may be associated with a particular transportation requestor (e.g., the particular transportation requestor's preferences, common routes, etc.), a category/class of transportation requestors (e.g., based on demographics), and/or all transportation requestors of transportation-matching system 601.

For example, historical data specific to a single transportation requestor may include information about past rides that a particular transportation requestor has taken, including the locations at which the transportation requestor is picked up and dropped off, music the transportation requestor likes to listen to, traffic information associated with the rides, time of day the transportation requestor most often rides, and any other suitable information specific to the transportation requestor. As another example, historical data associated with a category/class of transportation requestors may include common or popular ride preferences of transportation requestors in that category/class, such as teenagers preferring pop music, transportation requestors who frequently commute to the financial district may prefer to listen to the news, etc. As yet another example, historical data associated with all transportation requestors may include general usage trends, such as traffic and ride patterns.

Using such historical data, transportation-matching system 601 could be configured to predict and provide transportation suggestions in response to a transportation request. For instance, transportation-matching system 601 may be configured to apply one or more machine-learning techniques to such historical data in order to "train" a machine-learning model to predict transportation suggestions for a transportation request. In this respect, the one or more machine-learning techniques used to train such a machine-learning model may take any of various forms, examples of which may include a regression technique, a neural-network technique, a k-Nearest Neighbor (kNN) technique, a decision-tree technique, a support-vector-machines (SVM) technique, a Bayesian technique, an ensemble technique, a clustering technique, an association-rule-learning technique, and/or a dimensionality-reduction technique, among other possibilities.

In operation, transportation-matching system 601 may only be capable of storing and later accessing historical data for a given transportation requestor if the given transportation requestor previously decided to "opt-in" to having such information stored. In this respect, transportation-matching system 601 may maintain respective privacy settings for each transportation requestor that uses transportation-matching platform 600 and operate in accordance with these settings. For instance, if a given transportation requestor did not opt-in to having his or her information stored, then transportation-matching system 601 may forgo performing any of the above-mentioned functions based on historical data. Other possibilities also exist.

Transportation-matching system 601 may be configured to perform various other functions related to managing and facilitating transportation matching as well.

Referring again to FIG. 6, client station 602 of transportation requestor 603 may generally comprise any computing device that is configured to facilitate interaction between transportation requestor 603 and transportation-matching system 601. For instance, client station 602 may take the form of a smartphone, a tablet, a desktop computer, a laptop, a netbook, and/or a PDA, among other possibilities. Each such device may comprise an I/O interface, a communication interface, a GNSS unit such as a GPS unit, at least one processor, data storage, and executable program instructions for facilitating interaction between transportation requestor 603 and transportation-matching system 601 (which may be embodied in the form of a software application, such as a mobile application, web application, or the like). In this respect, the interaction that may take place between transportation requestor 603 and transportation-matching system 601 may take various forms, representative examples of which may include requests by transportation requestor 603 for new transportation events, confirmations by transportation-matching system 601 that transportation requestor 603 has been matched with a vehicle (e.g., vehicle 604), and updates by transportation-matching system 601 regarding the progress of the transportation event, among other possibilities.

In turn, vehicle 604 may generally comprise any kind of vehicle that can provide transportation, and in one example, may take the form of vehicle 500 described above. Further, the functionality carried out by vehicle 604 as part of transportation-matching platform 600 may take various forms, representative examples of which may include receiving a request from transportation-matching system 601 to handle a new transportation event, driving to a specified pickup location for a transportation event, driving from a specified pickup location to a specified drop-off location for a transportation event, and providing updates regarding the progress of a transportation event to transportation-matching system 601, among other possibilities.

Generally speaking, third-party system 605 may include one or more computing systems that collectively comprise a communication interface, at least one processor, data storage, and executable program instructions for carrying out functions related to a third-party subservice that facilitates the platform's transportation matching. These one or more computing systems may take various forms and may be arranged in various manners, such as any one of the forms and/or arrangements discussed above with reference to transportation-matching system 601.

Moreover, third-party system 605 may be configured to perform functions related to various subservices. For instance, as one possibility, third-party system 605 may be configured to monitor traffic conditions and provide traffic data to transportation-matching system 601 and/or vehicle 604, which may be used for a variety of purposes. For example, transportation-matching system 601 may use such data to facilitate fulfilling transportation requests in the first instance and/or updating the progress of initiated transportation events, and vehicle 604 may use such data to facilitate updating certain predictions regarding perceived agents and/or the vehicle's behavior plan, among other possibilities.

As another possibility, third-party system 605 may be configured to monitor weather conditions and provide weather data to transportation-matching system 601 and/or vehicle 604, which may be used for a variety of purposes. For example, transportation-matching system 601 may use such data to facilitate fulfilling transportation requests in the first instance and/or updating the progress of initiated transportation events, and vehicle 604 may use such data to facilitate updating certain predictions regarding perceived agents and/or the collection vehicle's behavior plan, among other possibilities.

As yet another possibility, third-party system 605 may be configured to authorize and process electronic payments for transportation requests. For example, after transportation requestor 603 submits a request for a new transportation event via client station 602, third-party system 605 may be configured to confirm that an electronic payment method for transportation requestor 603 is valid and authorized and then inform transportation-matching system 601 of this confirmation, which may cause transportation-matching system

601 to dispatch vehicle 604 to pick up transportation requestor 603. After receiving a notification that the transportation event is complete, third-party system 605 may then charge the authorized electronic payment method for transportation requestor 603 according to the fare for the transportation event. Other possibilities also exist.

Third-party system 605 may be configured to perform various other functions related to sub services that facilitate the platform's transportation matching as well. It should be understood that, although certain functions were discussed as being performed by third-party system 605, some or all of these functions may instead be performed by transportation-matching system 601.

As discussed above, transportation-matching system 601 may be communicatively coupled to client station 602, vehicle 604, and third-party system 605 via communication network 606, which may take various forms. For instance, at a high level, communication network 606 may include one or more Wide-Area Networks (WANs) (e.g., the Internet or a cellular network), Local-Area Networks (LANs), and/or Personal Area Networks (PANs), among other possibilities, where each such network may be wired and/or wireless and may carry data according to any of various different communication protocols. Further, it should be understood that the respective communication paths between the various entities of FIG. 6 may take other forms as well, including the possibility that such communication paths include communication links and/or intermediate devices that are not shown.

In the foregoing arrangement, client station 602, vehicle 604, and/or third-party system 605 may also be capable of indirectly communicating with one another via transportation-matching system 601. Additionally, although not shown, it is possible that client station 602, vehicle 604, and/or third-party system 605 may be configured to communicate directly with one another as well (e.g., via a short-range wireless communication path or the like). Further, vehicle 604 may also include a user-interface system that may facilitate direct interaction between transportation requestor 603 and vehicle 604 once transportation requestor 603 enters vehicle 604 and the transportation event begins.

It should be understood that transportation-matching platform 600 may include various other entities and take various other forms as well.

Turning now to FIG. 7, a simplified block diagram is provided to illustrate some structural components that may be included in an example computing platform 700, which may be configured to carry out the any of various functions disclosed herein—including but not limited to the functions included in the example pipeline described with reference to FIGS. 3 and 4A-4D. At a high level, computing platform 700 may generally comprise any one or more computer systems (e.g., one or more servers) that collectively include at least a processor 702, data storage 704, and a communication interface 706, all of which may be communicatively linked by a communication link 708 that may take the form of a system bus, a communication network such as a public, private, or hybrid cloud, or some other connection mechanism. Each of these components may take various forms.

For instance, processor 702 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 702 could comprise processing components that are distributed across a plurality of physical computing devices connected via a network, such as a computing cluster of a public, private, or hybrid cloud.

In turn, data storage 704 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 704 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 7, data storage 704 may be capable of storing both (i) program instructions that are executable by processor 702 such that the trajectory generation engine 203 is configured to perform any of the various functions disclosed herein (including but not limited to any the functions described with reference to FIGS. 3 and 4A-4D), and (ii) data that may be received, derived, or otherwise stored by computing platform 700. For instance, data storage 704 may include one or both of the collected sensor database 202 and the source-agnostic trajectory database 204 shown in FIG. 2, among other possibilities Communication interface 706 may take the form of any one or more interfaces that facilitate communication between computing platform 700 and other systems or devices. In this respect, each such interface may be wired and/or wireless and may communicate according to any of various communication protocols, examples of which may include Ethernet, Wi-Fi, Controller Area Network (CAN) bus, serial bus (e.g., Universal Serial Bus (USB) or Firewire), cellular network, and/or short-range wireless protocols, among other possibilities.

Although not shown, computing platform 700 may additionally include one or more input/output (I/O) interfaces that are configured to either (i) receive and/or capture information at computing platform 700 and (ii) output information to a client station (e.g., for presentation to a user). In this respect, the one or more I/O interfaces may include or provide connectivity to input components such as a microphone, a camera, a keyboard, a mouse, a trackpad, a touchscreen, and/or a stylus, among other possibilities, as well as output components such as a display screen and/or an audio speaker, among other possibilities.

It should be understood that computing platform 700 is one example of a computing platform that may be used with the embodiments described herein. Numerous other arrangements are possible and contemplated herein. For instance, other computing platforms may include additional components not pictured and/or more or less of the pictured components.

CONCLUSION

This disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and sprit of the present invention, which will be defined by the claims.

Further, to the extent that examples described herein involve operations performed or initiated by actors, such as "humans," "curators," "users" or other entities, this is for purposes of example and explanation only. The claims should not be construed as requiring action by such actors unless explicitly recited in the claim language.

We claim:

1. A computer-implemented method comprising:
obtaining, by a computing system, (i) a first set of sensor data captured by a first sensor system of a first vehicle, wherein the first set of sensor data indicates the first vehicle's movement and location with a first degree of accuracy and (ii) a second set of sensor data captured by a second sensor system of a second vehicle, wherein the second set of sensor data indicates the second vehicle's movement and location with a second degree of accuracy that differs from the first degree of accuracy;
based on the respective first and second sets of sensor data, generating, by the computing system, respective motion data for each of the respective first and second vehicles during a respective period of operation of the respective vehicle that is separated from Earth's rotational motion by, for each respective vehicle:
for each of a plurality of respective times during the respective period of operation:
determining the Earth's directional gravity vector at a respective time;
removing an effect of the Earth's directional gravity on an acceleration measurement captured by the respective sensor system; and
determining an acceleration and orientation of the respective sensor system of the respective vehicle at the respective time that are independent of the Earth's directional gravity vector and the Earth's magnetic field;
based on the respective motion data generated for the first vehicle, deriving, by the computing system, a first trajectory for the first vehicle that is defined in terms of a source-agnostic coordinate frame rather than a source-specific coordinate frame associated with the first sensor system;
based on the respective motion data generated for the second vehicle, deriving, by the computing system, a second trajectory for the second vehicle that is defined in terms of the source-agnostic coordinate frame rather than a source-specific coordinate frame associated with the second sensor system; and
storing, by the computing system, the first trajectory for the first vehicle and the second trajectory for the second vehicle in a database of source-agnostic trajectories.

2. The computer-implemented method of claim 1, wherein:
the first trajectory for the first vehicle represents the first vehicle's movement and location with the first degree of accuracy; and
the second trajectory for the second vehicle represents the second vehicle's movement and location with the second degree of accuracy.

3. The computer-implemented method of claim 2, further comprising:
determining the first degree of accuracy based on a type of the first sensor system; and
determining the second degree of accuracy based on a type of the second sensor system.

4. The computer-implemented method of claim 3, wherein:
the first trajectory for the first vehicle is stored in the database along with an indication of the determined first degree of accuracy; and
the second trajectory for the second vehicle is stored in the database along with an indication of the determined second degree of accuracy.

5. The computer-implemented method of claim 1, further comprising:
obtaining, from the database, the first trajectory for the first vehicle and the second trajectory for the second vehicle;
translating each of the first trajectory for the first vehicle and the second trajectory for the second vehicle from the source-agnostic coordinate frame to a local coordinate frame associated with a map of a geographic area; and
encoding the translated first trajectory for the first vehicle and the translated second trajectory for the second vehicle into the map as path priors.

6. The computer-implemented method of claim 1, further comprising:
obtaining, from the database, the first trajectory for the first vehicle and the second trajectory for the second vehicle;
translating each of the first trajectory for the first vehicle and the second trajectory for the second vehicle from the source-agnostic coordinate frame to a local coordinate frame associated with a map of a geographic area; and
based on the translated first trajectory for the first vehicle and the translated second trajectory for the second vehicle, generating lane information for a roadway junction that is represented within the map.

7. The computer-implemented method of claim 1, wherein the first and second sensor systems comprise different types of sensor systems.

8. The computer-implemented method of claim 1, wherein:
deriving the first trajectory for the first vehicle that is defined in Willis of the source-agnostic coordinate frame comprises:
based on the first set of sensor data, generating location data for the first vehicle that is defined in teal's of the source-agnostic coordinate frame; and
using the generated location data and the generated motion data for the first vehicle to derive the first trajectory for the first vehicle that is defined in terms of the source-agnostic coordinate frame; and
deriving the second trajectory for the second vehicle that is defined in teams of the source-agnostic coordinate frame comprises:
based on the second set of sensor data, generating location data for the second vehicle that is defined in teal's of the source-agnostic coordinate frame; and
using the generated location data and the generated motion data for the second vehicle to derive the second trajectory for the second vehicle that is defined in terms of the source-agnostic coordinate frame.

9. The computer-implemented method of claim 8, wherein generating the location data for each of the first and second vehicles comprises, for each respective vehicle:

generating location data that is represented according to a local coordinate frame associated with the respective sensor system of the respective vehicle by applying localization to at least a subset of the respective set of sensor data captured by the respective sensor system of the respective vehicle; and translating the generated location data from the local coordinate frame to the source-agnostic coordinate frame.

10. The computer-implemented method of claim 8, wherein generating the motion data for each of the first and second vehicles comprises, for each respective vehicle:

processing at least a subset of the respective set of sensor data captured by the respective sensor system of the respective vehicle in order to separate the motion of the respective vehicle during the respective period of operation from Earth's rotational motion during the respective period of operation.

11. The computer-implemented method of claim 10, wherein processing at least a subset of the respective set of sensor data captured by the respective sensor system of the respective vehicle in order to separate the motion of the respective vehicle from Earth's rotational motion comprises, for the plurality of respective times during the period of operation:

based on the Earth's directional gravity vector and the determined orientation of the respective sensor system of the respective vehicle, incrementally updating the acceleration measurement captured by the respective sensor system of the respective vehicle at the respective time.

12. A non-transitory computer-readable medium comprising program instructions stored thereon that are executable to cause a computing system to:

obtain (i) a first set of sensor data captured by a first sensor system of a first vehicle, wherein the first set of sensor data indicates the first vehicle's movement and location with a first degree of accuracy and (ii) a second set of sensor data captured by a second sensor system of a second vehicle, wherein the second set of sensor data indicates the second vehicle's movement and location with a second degree of accuracy that differs from the first degree of accuracy;

based on the respective first and second sets of sensor data, generate, by the computing system, respective motion data for each of the respective first and second vehicles during a respective period of operation of the respective vehicle that is separated from Earth's rotational motion by, for each respective vehicle:

for each of a plurality of respective times during the respective period of operation:
determine the Earth's directional gravity vector at a respective time;
remove an effect of the Earth's directional gravity on an acceleration measurement captured by the respective sensor system; and
determine an acceleration and orientation of the respective sensor system of the respective vehicle at the respective time that are independent of the Earth's directional gravity vector and the Earth's magnetic field;

based on the respective motion data generated for the first vehicle, derive a first trajectory for the first vehicle that is defined in Willis of a source-agnostic coordinate frame rather than a source-specific coordinate frame associated with the first sensor system;

based on the respective motion data generated for the second vehicle, derive a second trajectory for the second vehicle that is defined in terms of the source-agnostic coordinate frame rather than a source-specific coordinate frame associated with the second sensor system; and store the first trajectory for the first vehicle and the second trajectory for the second vehicle in a database of source-agnostic trajectories.

13. The computer-readable medium of claim 12, wherein:
the first trajectory for the first vehicle represents the first vehicle's movement and location with the first degree of accuracy; and
the second trajectory for the second vehicle represents the second vehicle's movement and location with the second degree of accuracy.

14. The computer-readable medium of claim 13, wherein the computer-readable medium further comprises program instructions stored thereon that are executable to cause the computing system to:
determine the first degree of accuracy based on a type of the first sensor system; and
determine the second degree of accuracy based on a type of the second sensor system.

15. The computer-readable medium of claim 14, wherein:
the first trajectory for the first vehicle is stored in the database along with an indication of the determined first degree of accuracy; and
the second trajectory for the second vehicle is stored in the database along with an indication of the determined second degree of accuracy.

16. The computer-readable medium of claim 12, wherein the computer-readable medium further comprises program instructions stored thereon that are executable to cause the computing system to:
obtain, from the database, the first trajectory for the first vehicle and the second trajectory for the second vehicle;
translate each of the first trajectory for the first vehicle and the second trajectory for the second vehicle from the source-agnostic coordinate frame to a local coordinate frame associated with a map of a geographic area; and
encode the translated first trajectory for the first vehicle and the translated second trajectory for the second vehicle into the map as path priors.

17. The computer-readable medium of claim 12, wherein the computer-readable medium further comprises program instructions stored thereon that are executable to cause the computing system to:
obtaining, from the database, the first trajectory for the first vehicle and the second trajectory for the second vehicle;
translating each of the first trajectory for the first vehicle and the second trajectory for the second vehicle from the source-agnostic coordinate frame to a local coordinate frame associated with a map of a geographic area; and
based on the translated first trajectory for the first vehicle and the translated second trajectory for the second vehicle, generating lane information for a roadway junction that is represented within the map.

18. The computer-readable medium of claim 12, wherein the first and second sensor systems comprise different types of sensor systems.

19. The computer-readable medium of claim 12, wherein
  deriving the first trajectory for the first vehicle that is defined in twits of the source-agnostic coordinate frame comprises:
    based on the first set of sensor data, generating location data for the first vehicle that is defined in twits of the source-agnostic coordinate frame; and
    using the generated location data and the generated motion data for the first vehicle to derive the first trajectory for the first vehicle that is defined in teinis of the source-agnostic coordinate frame; and
  deriving the second trajectory for the second vehicle that is defined in twits of the source-agnostic coordinate frame comprises:
    based on the second set of sensor data, generating location data for the second vehicle that is defined in terms of the source-agnostic coordinate frame; and
    using the generated location data and the generated motion data for the second vehicle to derive the second trajectory for the second vehicle that is defined in teinis of the source-agnostic coordinate frame.

20. A computing system comprising:
  at least one processor;
  a non-transitory computer-readable medium; and
  program instructions stored on the non-transitory computer-readable medium that are executable by the at least one processor such that the computing system is capable of:
    obtaining (i) a first set of sensor data captured by a first sensor system of a first vehicle, wherein the first set of sensor data indicates the first vehicle's movement and location with a first degree of accuracy and (ii) a second set of sensor data captured by a second sensor system of a second vehicle, wherein the second set of sensor data indicates the second vehicle's movement and location with a second degree of accuracy that differs from the first degree of accuracy;
    based on the respective first and second sets of sensor data, generate, by the computing system, respective motion data for each of the respective first and second vehicles during a respective period of operation of the respective vehicle that is separated from Earth's rotational motion by, for each respective vehicle:
      for each of a plurality of respective times during the respective period of operation:
        determine the Earth's directional gravity vector at a respective time;
        remove an effect of the Earth's directional gravity on an acceleration measurement captured by the respective sensor system; and
        determine an acceleration and orientation of the respective sensor system of the respective vehicle at the respective time that are independent of the Earth's directional gravity vector and the Earth's magnetic field;
    based on the respective motion data generated for the first vehicle, derive a first trajectory for the first vehicle that is defined in terms of a source-agnostic coordinate frame rather than a source-specific coordinate frame associated with the first sensor system;
    based on the respective motion data generated for the second vehicle, deriving a second trajectory for the second vehicle that is defined in terms of the source-agnostic coordinate frame rather than a source-specific coordinate frame associated with the second sensor system; and
    storing the first trajectory for the first vehicle and the second trajectory for the second vehicle in a database of source-agnostic trajectories.

* * * * *